United States Patent
Xin et al.

(10) Patent No.: US 11,115,802 B2
(45) Date of Patent: Sep. 7, 2021

(54) DATA PROCESSING METHOD AND SYSTEM TO ASSOCIATE DATA OF A TERMINAL DISTRIBUTED ON DIFFERENT NETWORK ELEMENTS

(71) Applicant: Huawei Technologies Co., Ltd., Shenzhen (CN)

(72) Inventors: Yang Xin, Shanghai (CN); Yizhuang Wu, Beijing (CN); Yongcui Li, Beijing (CN); Weiwei Chong, Shanghai (CN); Xiaobo Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/099,303

(22) Filed: Nov. 16, 2020

(65) Prior Publication Data

US 2021/0092588 A1    Mar. 25, 2021

Related U.S. Application Data

(63) Continuation of application No. PCT/CN2020/081411, filed on Mar. 26, 2020.

(30) Foreign Application Priority Data

Apr. 2, 2019  (CN) .......................... 201910263062.4

(51) Int. Cl.
*H04W 8/18* (2009.01)
*H04W 60/00* (2009.01)

(52) U.S. Cl.
CPC ............. *H04W 8/18* (2013.01); *H04W 60/00* (2013.01)

(58) Field of Classification Search
CPC ....... H04W 8/18; H04W 60/00; H04W 88/12; H04W 88/14; H04W 88/18; H04W 92/00;
(Continued)

(56) References Cited

U.S. PATENT DOCUMENTS

| | | | |
|---|---|---|---|
| 9,094,538 B2 * | 7/2015 | Mohammed et al. | H04W 4/24 |
| 10,904,739 B2 * | 1/2021 | Lee et al. | H04W 8/02 |

(Continued)

FOREIGN PATENT DOCUMENTS

| | | |
|---|---|---|
| CN | 103430483 A | 12/2013 |
| CN | 107567045 A | 1/2018 |
| WO | 2019032968 A1 | 2/2019 |

OTHER PUBLICATIONS

3GPP TS 23.288 V0.3.0, "3rd Generation Partnership Project; Technical Specification Group Services and System Aspects; Architecture enhancements for 5G System (5GS) to support network data analytics services, (Release 16)," Mar. 2019, 44 pages.

(Continued)

*Primary Examiner* — Meless N Zewdu
(74) *Attorney, Agent, or Firm* — Conley Rose, P.C.

(57) ABSTRACT

A method includes obtaining, by a data analytics network element, data of a terminal on an access network element and data of the terminal on an access and mobility management function network element, where the data of the terminal on the access network element includes a first identifier, and the access network element is an access network element, the data of the terminal on the access and mobility management function network element includes the first identifier, and the first identifier includes an identifier assigned by the access network element to the terminal, associating, by the data analytics network element, the data of the terminal on the access network element with the data of the terminal on the access and mobility management function network element based on the first identifier.

20 Claims, 10 Drawing Sheets

(58) Field of Classification Search
CPC ... H04W 92/10; H04W 92/08; H04W 88/085;
H04W 88/10; H04W 24/04; H04W 24/00;
H04W 52/14; H04W 12/73; H04W
28/0831; H04W 28/0835; H04W 28/0838;
H04W 28/0842; H04W 28/0808; H04W
88/00; H04W 88/02; H04W 88/08; G06F
11/07; G06K 9/4604; G06K 9/42; G06K
9/4638; G16Y 30/00; G16Y 30/10; G16Y
40/00; G16Y 40/10; G16Y 40/20; G16Y
40/30; G16Y 40/35; G16Y 40/40; G16Y
40/50; G16Y 40/60; G16Y 20/00; G16Y
20/10; G16Y 20/20; G16Y 20/30; G16Y
20/40; H04L 12/283; H04L 12/2856;
H04L 29/1233; H04L 29/12339; H04L
12/2863; H04L 12/4675; H04L 41/0293;
H04L 41/08; H04L 41/0803; H04L
63/1416; H04L 41/0686; H04L 41/0631;
H04L 29/06; H04L 12/24
See application file for complete search history.

(56) References Cited

U.S. PATENT DOCUMENTS

| | | | |
|---|---|---|---|
| 2014/0219107 | A1 | 8/2014 | Racz et al. |
| 2016/0065428 | A1* | 3/2016 | Srivastava et al. ... H04L 43/065 |
| 2017/0054605 | A1* | 2/2017 | Duncan et al. ....... H04L 41/145 |
| 2017/0230822 | A1* | 8/2017 | Gao ...................... H04W 8/205 |
| 2018/0262924 | A1 | 9/2018 | Dao et al. |
| 2020/0127907 | A1* | 4/2020 | Koo ........................ H04L 43/08 |
| 2020/0389811 | A1* | 12/2020 | Guo et al. ......... H04W 28/0268 |
| 2021/0022022 | A1* | 1/2021 | Guo et al. ............. H04W 24/08 |

OTHER PUBLICATIONS

3GPP TS 23.501 V16.0.2, "3rd Generation Partnership Project; Technical Specification Group Services and System Aspects; System Architecture for the 5G System; Stage 2 (Release 16)," Apr. 2019, 316 pages.
3GPP TS 23.502 V16.0.2, "3rd Generation Partnership Project; Technical Specification Group Services and System Aspects; Procedures for the 5G System; Stage 2 (Release 16)," Apr. 2019, 419 pages.
3GPP TS 23.503 V15.5.0, "3rd Generation Partnership Project; Technical Specification Group Services and System Aspects; Policy and Charging Control Framework for the 5G System; Stage 2 (Release 15)," Mar. 2019, 78 pages.
3GPP TR 23.791 V16.1.0, "3rd Generation Partnership Project; Technical Specification Group Services and System Aspects; Study of Enablers for Network Automation for 5G (Release 16)," Mar. 2019, 124 pages.
China Mobile, "General Solution proposal for Data Correlation," SA WG2 Meeting #132 S2-1903805, Apr. 8-12, 2019, Xi'an, China, 5 pages.
3GPP TS 26.247 V16.1.0, "3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 16)," Dec. 2018, 138 pages.
3GPP TS 32.422 V15.1.0, "3rd Generation Partnership Project; Technical Specification Group Services and System Aspects; Telecommunication management; Subscriber and equipment trace; Trace control and configuration management (Release 15)," Jun. 2018, 189 pages.
3GPP TS 36.213 V15.5.0, "3rd Generation Partnership Project; Technical Specification Group Radio Access Network; Evolved Universal Terrestrial Radio Access (E-UTRA); Physical layer procedures (Release 15)," Mar. 2019, 552 pages.
3GPP TS 36.214 V15.3.0, "3rd Generation Partnership Project; Technical Specification Group Radio Access Network; Evolved Universal Terrestrial Radio Access (E-UTRA); Physical layer;Measurements (Release 15)," Sep. 2018, 25 pages.
3GPP TS 36.314 V15.2.0 "3rd Generation Partnership Project; Technical Specification Group Radio Access Network; Evolved Universal Terrestrial Radio Access (E-UTRA); Layer 2—Measurements (Release 15)," Dec. 2018, 28 pages.
3GPP TS 36.321 V15.4.0, "3rd Generation Partnership Project;Technical Specification Group Radio Access Network; Evolved Universal Terrestrial Radio Access (E-UTRA); Medium Access Control (MAC) protocol specification (Release 15)," Dec. 2018, 131 pages.
3GPP TS 36.331 V15.4.0, "3rd Generation Partnership Project; Technical Specification Group Radio Access Network; Evolved Universal Terrestrial Radio Access (E-UTRA); Radio Resource Control (RRC); Protocol specification (Release 15)," Dec. 2018, 933 pages.
3GPP TS 37.320 V15.0.0 "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)," Jun. 2018, 27 pages.
3GPP TS 38.413 V15.2.0 "3rd Generation Partnership Project; Technical Specification Group Radio Access Network; NG-RAN; NG Application Protocol (NGAP) (Release 15)," Dec. 2018, 308 pages.
3GPP TS 38.460 V15.2.0 "3rd Generation Partnership Project; Technical Specification Group Radio Access Network; NG-RAN; E1 general aspects and principles (Release 15)," Dec. 2018, 10 pages.
3GPP TR 37.816 V0.1.0 "3rd Generation Partnership Project; Technical Specification Group Radio Access Network; Evolved Universal Terrestrial Radio Access (E-UTRA) and NR; Study on RAN-centric data collection and utilization for LTE and NR (Release 16)," Oct. 2018, 9 pages.
China Mobile, "Data collection proposal for RSRP and RSRQ," SA WG2 Meeting #131 S2-1901667, Feb. 25-Mar. 1, 2019, Santa Cruz de Tenerife, Spain, 5 pages.
Ericsson, "UPF data collection," 3GPP TSG-SA WG2 Meeting #131 S2-1901734, Feb. 25-Mar. 1, 2019, Santa Cruz, Tenerife, Spain, 6 pages.
China Mobile, "Data collection proposal for RSRP and RSRQ," SA WG2 Meeting #131 S2-1902402, Feb. 25-Mar. 1, 2019, Santa Cruz de Tenerife, Spain, 5 pages.
China Mobile,"Data collection proposal for RSRP and RSRQ",SA WG2 Meeting #131 S2-1902525, Feb. 25-Mar. 1, 2019, Santa Cruz de Tenerife, Spain, 5 pages.

* cited by examiner

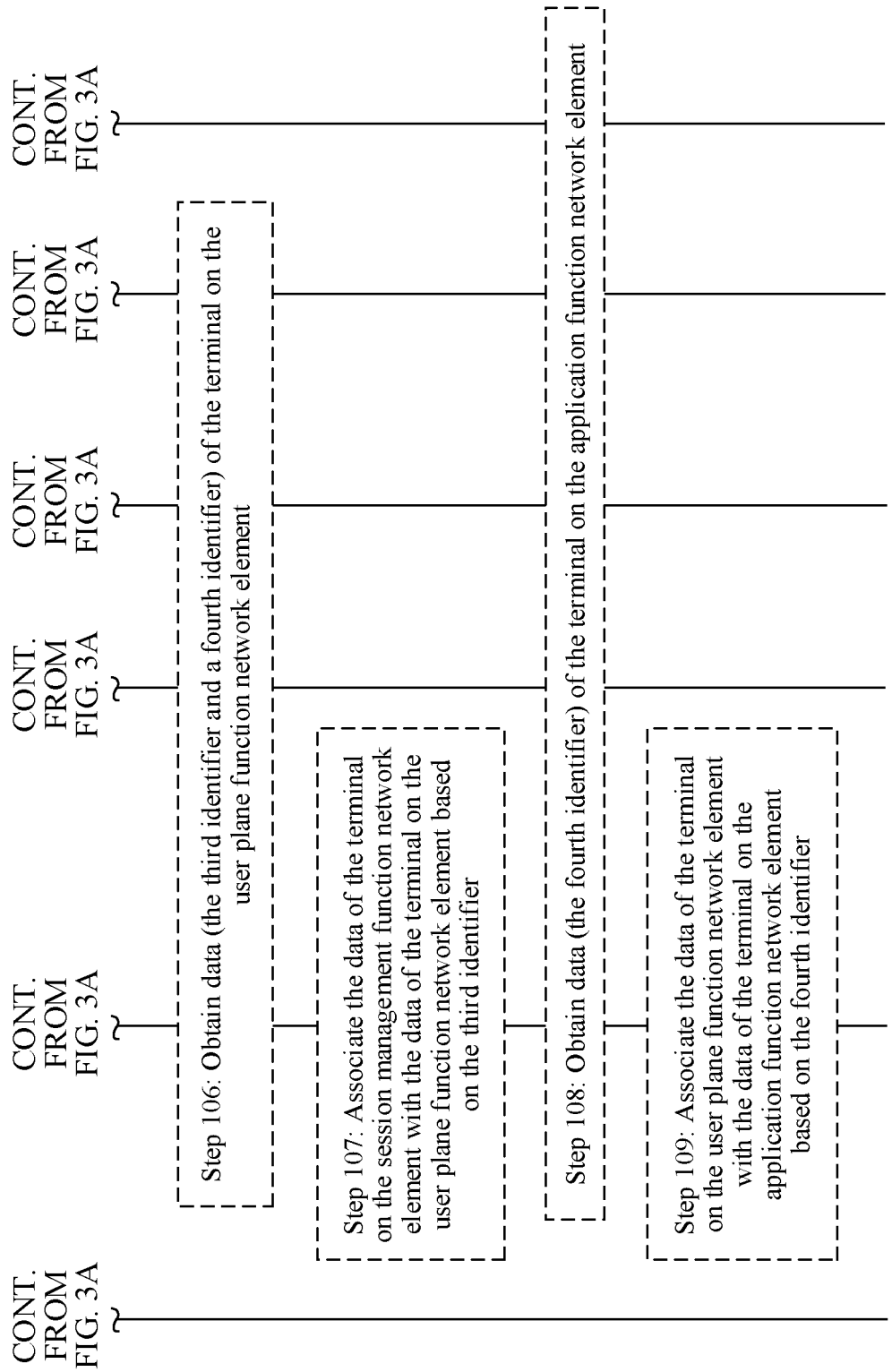

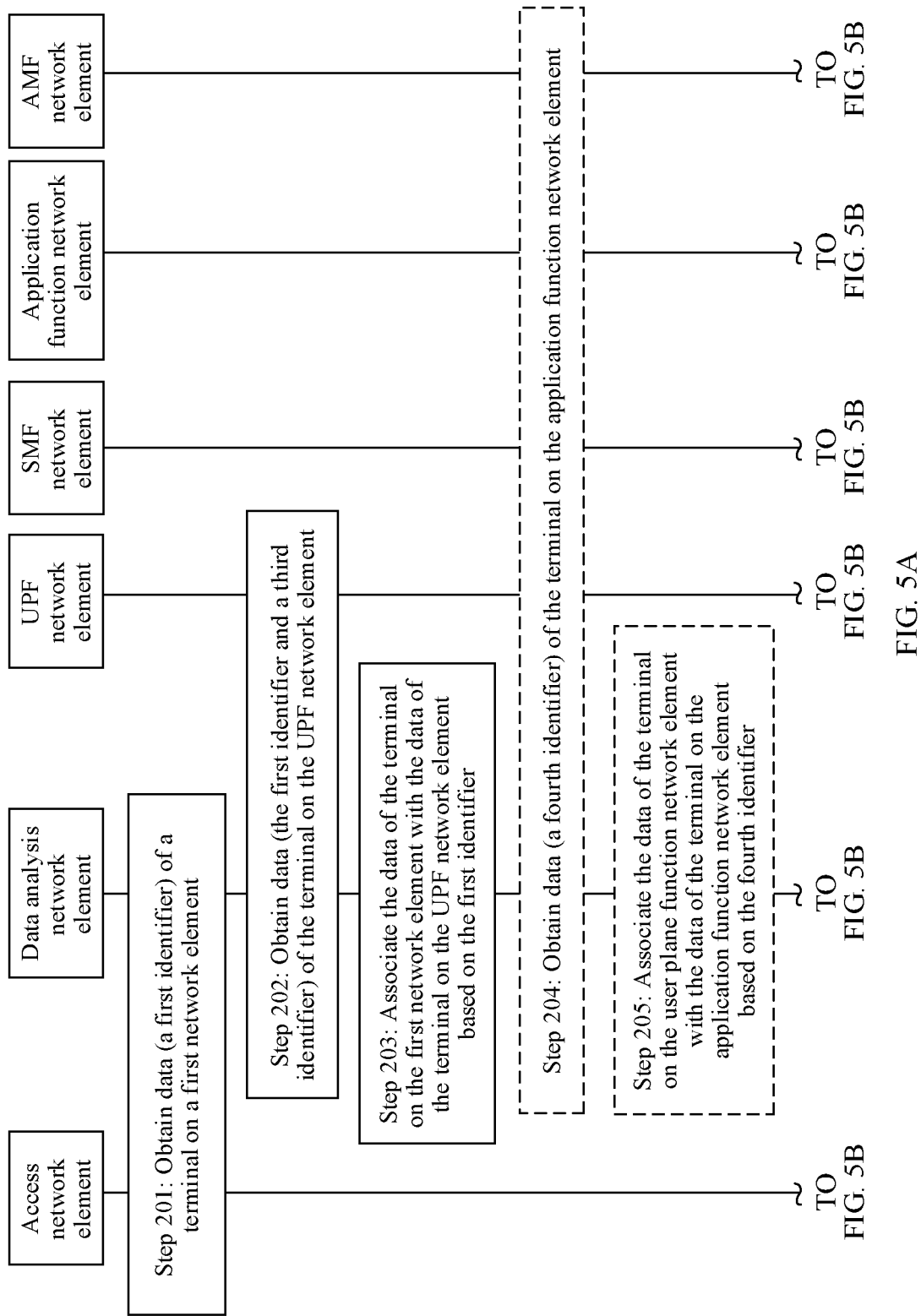

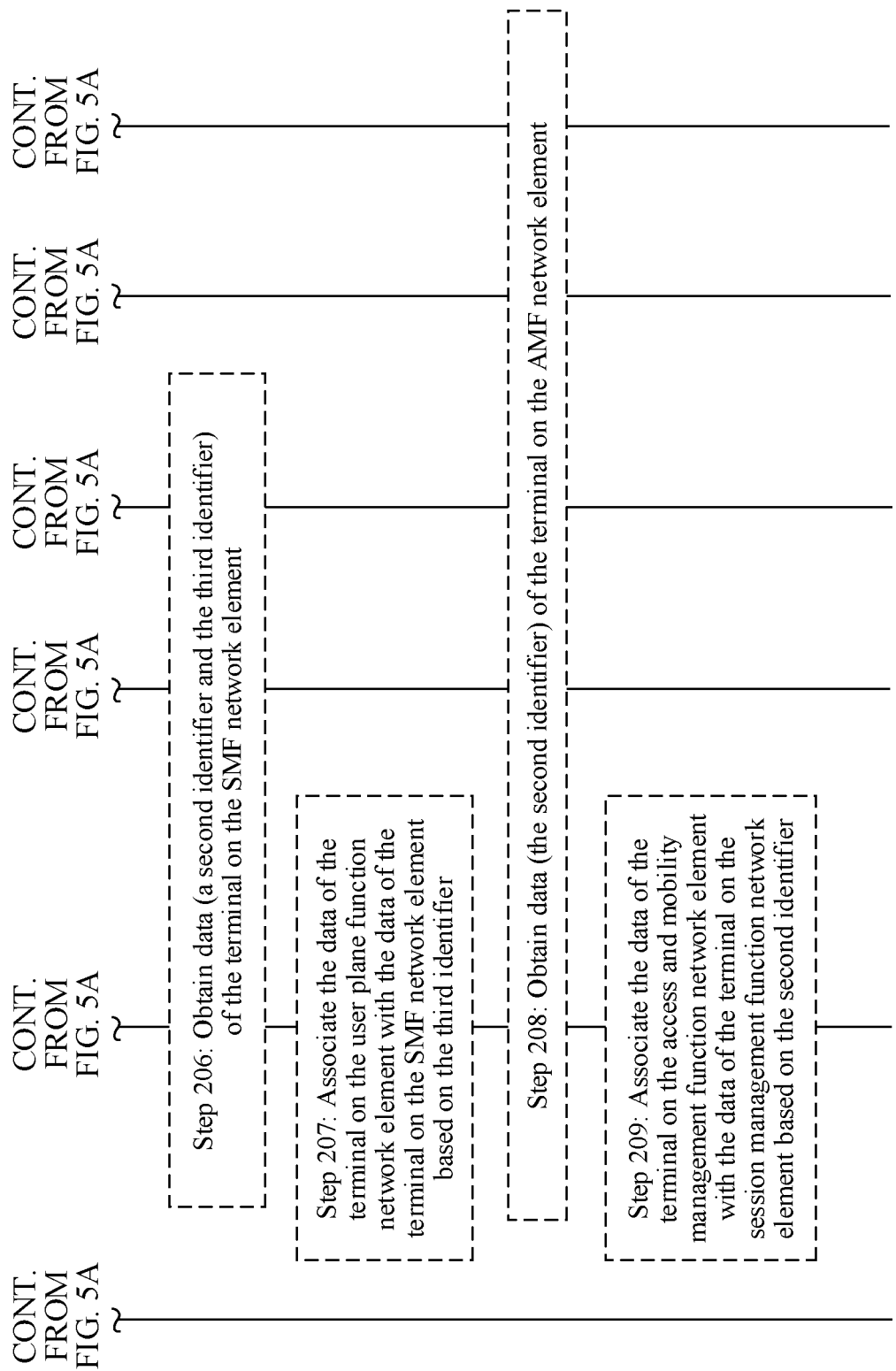

DATA PROCESSING METHOD AND SYSTEM TO ASSOCIATE DATA OF A TERMINAL DISTRIBUTED ON DIFFERENT NETWORK ELEMENTS

CROSS-REFERENCE TO RELATED APPLICATION

This application is a continuation of International Patent Application No. PCT/CN2020/081411, filed on Mar. 26, 2020, which claims priority to Chinese Patent Application No. 201910263062.4, filed on Apr. 2, 2019, both of which are hereby incorporated by reference in their entireties.

TECHNICAL FIELD

Embodiments of this application relate to the field of communications technologies, and in particular, to a data processing method and apparatus, and a system.

BACKGROUND

In a fifth generation (5G) communications network, a network data analytics function (NWDAF) network element is introduced into a core network (CN). The NWDAF network element obtains, using a big data analytics technology, a data analytics result based on data of a terminal that is collected from one or more network elements, and feeds back the data analytics result to the network element for policy formulation. However, how the NWDAF network element associates the collected data is a technical problem that urgently needs to be resolved currently.

SUMMARY

Embodiments of this application provide a data processing method and apparatus, and a system, to associate data of a terminal that is distributed on different network elements.

To resolve the foregoing technical problem, the embodiments of this application provide the following technical solutions.

According to a first aspect, an embodiment of this application provides a data processing method, including obtaining, by a data analytics network element, data of a terminal on a first network element, where the data of the terminal on the first network element includes a first identifier, and the first network element is an access network element, obtaining, by the data analytics network element, data on a second network element, where the data on the second network element includes data of the terminal on the second network element, the data of the terminal on the second network element includes the first identifier, and the first identifier includes any one or more of the following information an identifier assigned by the first network element to the terminal and/or an identifier assigned by the second network element to the terminal, and associating, by the data analytics network element, the data of the terminal on the first network element with the data of the terminal on the second network element based on the first identifier.

In this embodiment of this application, the first identifier may be replaced with first association information. In other words, the first identifier is the first association information.

According to the data processing method provided in this embodiment of this application, the data analytics network element obtains the data of the terminal on the first network element and the data of the terminal on the second network element. The data analytics network element associates the data of the terminal on the first network element with the data of the terminal on the second network element based on the first identifier such that the data analytics network element subsequently obtains, using a big data analytics technology, a data analytics result based on associated data of the terminal on at least two network elements.

In a possible implementation, the first identifier further includes at least one of the following information an identifier of the first network element, an identifier of the second network element, an identifier of the terminal, a session identifier of the terminal, a flow identifier of the terminal, network instance information, and area information of the terminal.

In a possible implementation, the flow identifier of the terminal is a service flow identifier of the terminal.

In a possible implementation, the second network element is one of an access and mobility management function (AMF) network element, a user plane function (UPF) network element, a session management function (SMF) network element, a policy control function (PCF) network element, and a terminal. In this way, the data of the terminal on the access network element can be associated with the data of the terminal on the AMF network element, or the data of the terminal on the access network element is associated with the data of the terminal on the terminal, or the data of the terminal on the access network element is associated with the data of the terminal on the UPF network element, or the data of the terminal on the access network element is associated with the data of the terminal on the SMF network element, or the data of the terminal on the access network element is associated with the data of the terminal on the PCF network element.

In a possible implementation, the second network element is an AMF network element. In this way, the data of the terminal on the access network element can be associated with the data of the terminal on the AMF network element.

In a possible implementation, the data of the terminal on the AMF network element further includes a second identifier, and the second identifier is usable for associating the data of the terminal on the AMF network element with data of the terminal on a SMF network element. The method provided in this embodiment of this application further includes obtaining, by the data analytics network element, the data of the terminal on the SMF network element, where the data of the terminal on the SMF network element includes the second identifier, and associating, by the data analytics network element, the data of the terminal on the AMF network element with the data of the terminal on the SMF network element based on the second identifier. When the second network element is the AMF network element, the data of the terminal on the AMF network element may be further associated with the data of the terminal on the SMF network element.

In a possible implementation, the second identifier includes at least one of the following information a session management context identifier of the terminal, an identifier of the AMF network element, an identifier of the SMF network element, a cell global identifier (CGI), the identifier of the terminal, and the session identifier of the terminal. In this way, the first network element can associate the data of the terminal on the AMF network element with the data of the terminal on the SMF network element based on the diverse identifiers.

In this embodiment of this application, the second identifier may be replaced with second association information. In other words, the second identifier is the second association information.

In a possible implementation, the data of the terminal on the SMF network element further includes a third identifier, and the third identifier is usable for associating the data of the terminal on the SMF network element with data of the terminal on a UPF network element. The method provided in this embodiment of this application further includes obtaining, by the data analytics network element, the data of the terminal on the UPF network element, where the data of the terminal on the UPF network element includes the third identifier, and associating, by the data analytics network element, the data of the terminal on the SMF network element with the data of the terminal on the UPF network element based on the third identifier. In this way, the data of the terminal on the SMF network element can be associated with the data of the terminal on the UPF network element.

In a possible implementation, the third identifier includes at least one of the following information an identifier assigned by the SMF network element to a session of the terminal, the identifier of the SMF network element, an identifier of the UPF network element, the session identifier of the terminal, the flow identifier of the terminal, and the identifier of the terminal.

In this embodiment of this application, the third identifier may be replaced with third association information. In other words, the third identifier is the third association information.

In a possible implementation, the flow identifier of the terminal is a service flow identifier of the terminal.

In a possible implementation, the data of the terminal on the UPF network element further includes a fourth identifier, and the fourth identifier is usable for associating the data of the terminal on the UPF network element with data of the terminal on an application function (AF) network element. The method provided in this embodiment of this application further includes obtaining, by the data analytics network element, the data of the terminal on the AF network element, where the data of the terminal on the AF network element includes the fourth identifier, and associating, by the data analytics network element, the data of the terminal on the UPF network element with the data of the terminal on the AF network element based on the fourth identifier.

In a possible implementation, the fourth identifier includes at least one of the following information an Internet Protocol (IP) 5-tuple, the identifier of the terminal, the identifier of the UPF network element, a service identifier of a service, an identifier of a service server, and an identifier of the AF network element.

In a possible implementation, the identifier assigned by the first network element to the terminal is an identifier assigned by the access network element to the terminal on a first interface, and the first interface is an interface between the access network element and the AMF network element. The identifier assigned by the second network element to the terminal is an identifier assigned by the AMF network element to the terminal on the first interface.

In this embodiment of this application, the fourth identifier may be replaced with fourth association information. In other words, the fourth identifier is the fourth association information.

In a possible implementation, the identifier assigned by the SMF network element to the session of the terminal is an identifier assigned by the SMF network element to the session of the terminal on a second interface, and the second interface is an interface between the SMF network element and the UPF network element.

In a possible implementation, the obtaining, by a data analytics network element, data of a terminal on a first network element includes sending, by the data analytics network element, a request to a network management network element or the AMF network element, where the request is usable for requesting the data of the terminal on the first network element, and the request includes any one or more of the following information corresponding to the terminal the area information, time information, and a terminal type, and receiving, by the data analytics network element, the data of the terminal on the first network element from the network management network element or the AMF network element.

In a possible implementation, the data analytics network element sends, to the network management network element or the AMF network element, indication information used to indicate the first network element to report the first identifier.

In a possible implementation, the obtaining, by a data analytics network element, data of a terminal on a first network element includes sending, by the data analytics network element to the first network element, a request used to request the data of the terminal on the first network element, where the request includes any one or more of the following information corresponding to the terminal the area information, time information, and a terminal type, and receiving, by the data analytics network element, the data of the terminal on the first network element from the first network element.

In a possible implementation, the data analytics network element sends a data request message to the second network element, where the data request message includes any one or more of the following information corresponding to the terminal the area information, the time information, a group identifier, the terminal type, and service information. The data analytics network element receives the data on the second network element from the second network element.

In a possible implementation, the service information includes any one or more of the following information a service identifier, an IP address of the service server, a port number of the service server, a transport layer protocol of a service, media information, and a service priority.

It should be understood that if the second network element is a UPF network element, the data analytics network element may send a data request message to the SMF network element. The data request message is usable for requesting the data on the second network element, and the data request message includes any one or more of the following information corresponding to the terminal the area information, time information, a group identifier, a terminal type, the service identifier, and information about the service server. The data analytics network element receives the data on the second network element from the second network element through the SMF network element or directly receives the data on the second network element from the second network element.

It should be understood that if the second network element is a UPF network element, the method provided in the first aspect may further include a process performed by a first network element in possible implementations of a third aspect. Details are not described herein.

In a possible implementation, if the second network element is a terminal, the identifier assigned by the first network element to the terminal is an identifier assigned by the first network element to the terminal on a first interface. In this case, the first interface is an interface between the access network element and the terminal.

In a possible implementation, the first identifier may further include time information or a trace recording session reference. The time information is usable for indicating a valid time period, time interval, slot, time window, timestamp, or time point of the first identifier. The trace recording session reference is usable for indicating a trace record of the terminal.

In a possible implementation, the second identifier may further include time information or a trace recording session reference. The time information is usable for indicating a valid time period, time interval, slot, time window, timestamp, or time point of the second identifier. The trace recording session reference is usable for indicating a trace record of the terminal.

In a possible implementation, the third identifier may further include time information or a trace recording session reference. The time information is usable for indicating a valid time period, time interval, slot, time window, timestamp, or time point of the third identifier. The trace recording session reference is usable for indicating a trace record of the terminal.

In a possible implementation, the fourth identifier may further include time information or a trace recording session reference. The time information is usable for indicating a valid time period, time interval, slot, time window, timestamp, or time point of the fourth identifier. The trace recording session reference is usable for indicating a trace record of the terminal.

In a possible implementation, the first identifier may further include a timestamp, and the timestamp included in the first identifier is usable for indicating a moment at which the first identifier is generated. The moment at which the first identifier is generated may be understood as a moment at which data of the terminal on a network element is generated on the network element, and is equivalent to "a moment of data of the terminal on each network element". For example, the timestamp included in the first identifier is a moment, recorded on the access network element, of the data of the terminal on the access network element (that is, a moment at which the data of the terminal on the access network element is generated after the terminal accesses the access network element), and/or a moment, recorded on the AMF network element, of the data of the terminal on the AMF network element.

In a possible implementation, the second identifier may further include a timestamp, and the timestamp included in the second identifier is usable for indicating a moment at which the second identifier is generated. The moment at which the second identifier is generated may be understood as a moment at which data of the terminal on a network element is generated on the network element, and is equivalent to "a moment of data of the terminal on each network element". For example, the timestamp included in the second identifier is a moment, recorded on the AMF network element, of the data of the terminal on the AMF network element, and/or a moment, recorded on the SMF network element, of the data of the terminal on the SMF network element.

In a possible implementation, the third identifier may further include a timestamp, and the timestamp included in the third identifier is usable for indicating a moment at which the third identifier is generated. The moment at which the third identifier is generated may be understood as a moment at which data of the terminal on a network element is generated on the network element, and is equivalent to "a moment of data of the terminal on each network element". For example, the timestamp included in the third identifier is a moment, recorded on the SMF network element, of the data of the terminal on the SMF network element and/or a moment, recorded on the UPF network element, of the data of the terminal on the UPF network element.

In a possible implementation, the fourth identifier may further include a timestamp, and the timestamp included in the fourth identifier is usable for indicating a moment at which the fourth identifier is generated. The moment at which the fourth identifier is generated may be understood as a moment at which data of the terminal on a network element is generated on the network element, and is equivalent to "a moment of data of the terminal on each network element". For example, the timestamp included in the fourth identifier is a moment, recorded on the UPF network element, of the data of the terminal on the UPF network element and/or a moment, recorded on the AF network element, of the data of the terminal on the AF network element.

According to a second aspect, an embodiment of this application provides a data processing method, including obtaining, by a first network element, data of a terminal on the first network element, where the data includes a first identifier, the first network element is an access network element, and the first identifier includes any one or more of the following information an identifier of the terminal, an identifier assigned by the first network element to the terminal, or an identifier assigned by a second network element to the terminal, and sending, by the first network element, the data of the terminal on the first network element to a data analytics network element.

In a possible implementation, the first identifier further includes at least one of the following information an identifier of the first network element, an identifier of the second network element, a session identifier of the terminal, a flow identifier of the terminal, network instance information, and area information of the terminal.

In a possible implementation, the flow identifier of the terminal is a service flow identifier of the terminal.

In a possible implementation, the identifier assigned by the first network element to the terminal is an identifier assigned by the access network element to the terminal on a first interface, and the first interface is an interface between the access network element and an AMF network element. The identifier assigned by the second network element to the terminal is an identifier assigned by the AMF network element to the terminal on the first interface.

In a possible implementation, the method provided in this embodiment of this application further includes receiving, by the first network element, a request from the data analytics network element through a network management network element or the AMF element, where the request is usable for requesting the data of the terminal on the first network element, and the request includes any one or more of the following information corresponding to the terminal area information, time information, and a terminal type.

In a possible implementation, the method provided in this embodiment of this application further includes receiving, by the first network element, indication information from the data analytics network element through the network management network element or the AMF network element, where the indication information is usable for indicating the first network element to report the first identifier.

In a possible implementation, the method provided in this embodiment of this application further includes receiving, by the first network element, a request from the data analytics network element, where the request is usable for requesting the data of the terminal on the first network element, and the request includes any one or more of the following information corresponding to the terminal area information, time information, and a terminal type.

In a possible implementation, the method provided in this embodiment of this application further includes receiving, by the first network element, indication information from the data analytics network element, where the indication information is usable for indicating the first network element to report the first identifier.

According to a third aspect, an embodiment of this application provides a data processing method, including obtaining, by a data analytics network element, data of a terminal on a first network element, obtaining, by the data analytics network elements, data on a second network element, where the data on the second network element includes data of the terminal on the second network element, the data of the terminal on the first network element includes a first identifier, the first network element is an access network element, the data of the terminal on the second network element includes the first identifier, and the first identifier includes any one or more of the following information an identifier of the terminal, an identifier assigned by the first network element to the terminal, or an identifier assigned by the second network element to the terminal, and associating, by the data analytics network element, the data of the terminal on the first network element with the data of the terminal on the second network element based on the first identifier.

In a possible implementation, the first identifier further includes at least one of the following information an identifier of the first network element, an identifier of the second network element, the identifier of the terminal, a session identifier of the terminal, a flow identifier of the terminal, network instance information, and area information of the terminal.

In a possible implementation, the flow identifier of the terminal is a service flow identifier of the terminal.

In a possible implementation, the second network element is a UPF network element. In this way, the data of the terminal on the access network element is associated with the data of the terminal on the UPF network element.

In a possible implementation, the data of the terminal on the UPF network element further includes a fourth identifier, and the fourth identifier is usable for associating the data of the terminal on the UPF network element with data of the terminal on an AF network element. The method provided in this embodiment of this application further includes obtaining, by the data analytics network element, the data of the terminal on the AF network element, where the data of the terminal on the AF network element includes the fourth identifier, and associating, by the data analytics network element, the data of the terminal on the UPF network element with the data of the terminal on the AF network element based on the fourth identifier.

In a possible implementation, the fourth identifier includes at least one of the following information an IP 5-tuple, the identifier of the terminal, an identifier of the UPF network element, a service identifier of a service, an identifier of a service server, and an identifier of the AF network element.

In a possible implementation, the data of the terminal on the UPF network element further includes a third identifier, and the third identifier is usable for associating data of the terminal on a SMF network element with the data of the terminal on the UPF network element. The method provided in this embodiment of this application further includes obtaining, by the data analytics network element, the data of the terminal on the SMF network element, where the data of the terminal on the SMF network element includes the third identifier, and associating, by the data analytics network element, the data of the terminal on the SMF network element with the data of the terminal on the UPF network element based on the third identifier.

In a possible implementation, the third identifier includes at least one of the following information an identifier assigned by the SMF network element to a session of the terminal, an identifier of the SMF network element, the identifier of the UPF network element, the session identifier of the terminal, the flow identifier of the terminal, and the identifier of the terminal.

In a possible implementation, the flow identifier of the terminal is a service flow identifier of the terminal.

In a possible implementation, the data of the terminal on the SMF network element further includes a second identifier, and the second identifier is usable for associating data of the terminal on an AMF network element with the data of the terminal on the SMF network element. The method provided in this embodiment of this application further includes obtaining, by the data analytics network element, the data of the terminal on the AMF network element, where the data of the terminal on the AMF network element includes the second identifier, and associating, by the data analytics network element, the data of the terminal on the AMF network element with the data of the terminal on the SMF network element based on the second identifier.

In a possible implementation, the second identifier includes at least one of the following information a session management context identifier of the terminal, an identifier of the AMF network element, the identifier of the SMF network element, a CGI, the session identifier of the terminal, and the identifier of the terminal.

In a possible implementation, the identifier assigned by the first network element to the terminal is an identifier assigned by the access network element to the terminal on a third interface, and the third interface is an interface between the access network element and the UPF network element. The identifier assigned by the second network element to the terminal is an identifier assigned by the UPF network element to the terminal on the third interface.

It should be understood that, for a process in which the data analytics network element obtains the data of the terminal on the first network element in the third aspect, refer to the description in the first aspect. Details are not described herein again.

According to a fourth aspect, an embodiment of this application provides a data processing method. The method includes determining, by an AMF network element, data of a terminal on the AMF network element, where the data of the terminal on the AMF network element includes a first identifier, and sending, by the AMF network element, the data of the terminal on the AMF network element to a data analytics network element. The first identifier includes any one or more of the following information an identifier of the terminal, an identifier assigned by a first network element to the terminal, or an identifier assigned by a second network element to the terminal. The first network element is an access network element, and the second network element is the access and mobility management network element.

In a possible implementation, the first identifier further includes at least one of the following information an identifier of the first network element, an identifier of the second network element, a session identifier of the terminal, a flow identifier of the terminal, network instance information, and area information of the terminal.

In a possible implementation, the data of the terminal on the AMF network element further includes a second identifier, and the second identifier is usable for associating the data of the terminal on the AMF network element with data of the terminal on a SMF network element.

Specifically, for description of the second identifier, refer to the related description in the first aspect. Details are not described herein again.

In a possible implementation, before the determining, by an AMF network element, data of a terminal on the AMF network element, the method provided in this embodiment of this application further includes receiving, by the AMF network element, a request message from the data analytics network element, where the request message is usable for requesting the data of the terminal on the AMF network element. For example, the request message includes any one or more of the following information the identifier of the terminal, a group identifier of the terminal, area information, time information, and a terminal type. In addition, in an optional implementation, the request message may further include an indication used to indicate the AMF network element to report the first identifier or the second identifier.

According to a fifth aspect, an embodiment of this application provides a data processing method. The method includes obtaining, by a SMF network element, data of a terminal on the SMF network element, and sending, by the SMF network element, the data of the terminal on the SMF network element to a data analytics network element. The data of the terminal on the SMF network element includes a second identifier, and the second identifier is usable for associating data of the terminal on an AMF network element with the data of the terminal on the SMF network element.

For specific content of the second identifier herein, refer to the related description in the first aspect. Details are not described herein again.

In a possible implementation, the data of the terminal on the SMF network element further includes a third identifier, and the third identifier is usable for associating the data of the terminal on the SMF network element with data of the terminal on a UPF network element.

For specific content of the third identifier herein, refer to the related description in the first aspect. Details are not described herein again.

In a possible implementation, before the obtaining, by a SMF network element, data of a terminal on the SMF network element, the method provided in this embodiment of this application further includes receiving, by the SMF network element, a request message from the data analytics network element, where the request message is usable for requesting the data of the terminal on the SMF network element. For example, the request message includes any one or more of the following information an identifier of the terminal, a group identifier of the terminal, area information, time information, a terminal type, and service information. In addition, in an optional implementation, the request message may further include an indication used to indicate the SMF network element to report the second identifier or the third identifier.

In a possible implementation, the service information includes any one or more of the following information a service identifier, an IP address of a service server, a port number of the service server, a transport layer protocol of a service, media information, and a service priority.

In a possible implementation, in the method provided in this embodiment of this application, the SMF network element sends a request message to the UPF network element, where the request message is usable for requesting the data of the terminal on the UPF network element. For example, the request message includes any one or more of the following information an identifier of the terminal, a group identifier of the terminal, area information, time information, a terminal type, and service information. In addition, in an optional implementation, the request message may further include an indication used to indicate the SMF network element to report the third identifier or a fourth identifier.

For specific content of the third identifier or the fourth identifier herein, refer to the related description in the first aspect. Details are not described herein again.

According to a sixth aspect, an embodiment of this application provides a data processing method. The method includes obtaining, by an AF network element, data of a terminal on the AF network element, and sending, by the AF network element, the data of the terminal on the AF network element to a data analytics network element. The data of the terminal on the AF network element includes a fourth identifier, and the fourth identifier is usable for associating data of the terminal on a UPF network element with the data of the terminal on the AF network element.

For specific content of the fourth identifier herein, refer to the related description in the first aspect. Details are not described herein again.

In a possible implementation, before the obtaining, by an AF network element, data of a terminal on the AF network element, the method provided in this embodiment of this application further includes receiving, by the AF network element, a request message from the data analytics network element, where the request message is usable for requesting the data of the terminal on the AF network element. For example, the request message includes any one or more of the following information an identifier of the terminal, a group identifier of the terminal, area information, a geographical area, time information, a terminal type, and service information. In addition, in an optional implementation, the request message may further include an indication used to indicate the AF network element to report the fourth identifier.

In a possible implementation, the service information includes any one or more of the following information a service identifier, an IP address of a service server, a port number of the service server, a transport layer protocol of a service, media information, and a service priority.

According to a seventh aspect, an embodiment of this application provides a data processing method, including obtaining, by a UPF network element, data of a terminal on the UPF network element, where the data of the terminal on the UPF network element includes a third identifier used to associate data of the terminal on a SMF network element with the data of the terminal on the UPF network element, and sending, by the UPF network element, the data of the terminal on the UPF network element to a data analytics network element.

For specific content of the third identifier, refer to the description in the first aspect. Details are not described herein again.

In a possible implementation, the data of the terminal on the UPF network element includes a fourth identifier used to associate the data of the terminal on the UPF network element with data of the terminal on an AF network element. For specific content of the fourth identifier, refer to the description in the first aspect. Details are not described herein again.

In a possible implementation, the method provided in this embodiment of this application further includes receiving, by the UPF network element, a request message from the data analytics network element or the SMF network element, where the request message is usable for requesting the data of the terminal on the UPF network element. For example, the request message includes any one or more of the following information an identifier of the terminal, a group identifier of the terminal, area information, time information, a terminal type, and service information. In addition, in an optional implementation, the request message may further include an indication used to indicate the UPF network element to report the third identifier or the fourth identifier.

In a possible implementation, the service information includes any one or more of the following information a service identifier, an IP address of a service server, a port number of the service server, a transport layer protocol of a service, media information, and a service priority.

According to an eighth aspect, this application provides a data processing apparatus. The data processing apparatus may implement the method in any one of the first aspect or the possible implementations of the first aspect, and therefore can also achieve the beneficial effects in any one of the first aspect or the possible implementations of the first aspect. The data processing apparatus may be a data analytics network element, or may be an apparatus that can support the data analytics network element in implementing the method in any one of the first aspect or the possible implementations of the first aspect, for example, a chip applied to the data analytics network element. The apparatus may implement the foregoing method using software or hardware, or by executing corresponding software by hardware.

In an example, the data processing apparatus in this embodiment of this application includes a communications unit configured to obtain data of a terminal on a first network element, where the data of the terminal on the first network element includes a first identifier, where the communications unit is further configured to obtain data on a second network element, where the data on the second network element includes data of the terminal on the second network element, and the data of the terminal on the second network element includes the first identifier, and a processing unit configured to associate the data of the terminal on the first network element with the data of the terminal on the second network element based on the first identifier. The first network element is an access network element. The first identifier includes any one or more of the following information an identifier assigned by the first network element to the terminal or an identifier assigned by the second network element to the terminal.

In a possible implementation, the first identifier further includes at least one of the following information an identifier of the first network element, an identifier of the second network element, an identifier of the terminal, a session identifier of the terminal, a flow identifier of the terminal, network instance information, and area information of the terminal.

In a possible implementation, the flow identifier of the terminal is a service flow identifier of the terminal.

In a possible implementation, the second network element is an AMF network element.

In a possible implementation, the data of the terminal on the AMF network element further includes a second identifier, and the second identifier is usable for associating the data of the terminal on the AMF network element with data of the terminal on a SMF network element. The communications unit is further configured to obtain the data of the terminal on the SMF network element, where the data of the terminal on the SMF network element includes the second identifier. The processing unit is further configured to associate the data of the terminal on the AMF network element with the data of the terminal on the SMF network element based on the second identifier.

In a possible implementation, the second identifier includes at least one of the following information a session management context identifier of the terminal, an identifier of the AMF network element, an identifier of the SMF network element, a CGI, the identifier of the terminal, and the session identifier of the terminal.

In a possible implementation, the data of the terminal on the SMF network element further includes a third identifier, and the third identifier is usable for associating the data of the terminal on the SMF network element with data of the terminal on a UPF network element. The communications unit is further configured to obtain the data of the terminal on the UPF network element, where the data of the terminal on the UPF network element includes the third identifier. The processing unit is further configured to associate the data of the terminal on the SMF network element with the data of the terminal on the UPF network element based on the third identifier.

In a possible implementation, the third identifier includes at least one of the following information an identifier assigned by the SMF network element to a session of the terminal, the identifier of the SMF network element, an identifier of the UPF network element, the session identifier of the terminal, the flow identifier of the terminal, and the identifier of the terminal.

In a possible implementation, the flow identifier of the terminal is a service flow identifier of the terminal.

In a possible implementation, the data of the terminal on the UPF network element further includes a fourth identifier, and the fourth identifier is usable for associating the data of the terminal on the UPF network element with data of the terminal on an AF network element. The communications unit is further configured to obtain the data of the terminal on the AF network element, where the data of the terminal on the AF network element includes the fourth identifier. The processing unit is further configured to associate the data of the terminal on the UPF network element with the data of the terminal on the AF network element based on the fourth identifier.

In a possible implementation, the fourth identifier includes at least one of the following information an IP 5-tuple, the identifier of the terminal, the identifier of the UPF network element, a service identifier of a service, an identifier of a service server, and an identifier of the AF network element.

In a possible implementation, the identifier assigned by the first network element to the terminal is an identifier assigned by the access network element to the terminal on a first interface, and the first interface is an interface between the access network element and the AMF network element. The identifier assigned by the second network element to the terminal is an identifier assigned by the AMF network element to the terminal on the first interface.

In a possible implementation, the identifier assigned by the SMF network element to the session of the terminal is an identifier assigned by the SMF network element to the session of the terminal on a second interface, and the second interface is an interface between the SMF network element and the UPF network element.

In a possible implementation, the communications unit is further configured to send a request to a network management network element or the AMF network element, where the request is usable for requesting the data of the terminal on the first network element, and the request includes any one or more of the following information corresponding to the terminal the area information, time information, and a terminal type. The communications unit is further configured to receive the data of the terminal on the first network element from the network management network element or the AMF network element.

In a possible implementation, the communications unit is further configured to send indication information to the network management network element or the AMF network element, where the indication information is usable for indicating the first network element to report the first identifier.

In another example, the data processing apparatus provided in this embodiment of this application may be a data analytics network element, or may be a chip in the data analytics network element. The data processing apparatus may include a communications unit and a processing unit. When the data processing apparatus is a data analytics network element, the communications unit may be an interface circuit. The data processing apparatus may further include a storage unit. The storage unit may be a memory. The storage unit is configured to store computer program code, and the computer program code includes an instruction. The processing unit may be a processor. The processing unit executes the instruction stored in the storage unit such that the data analytics network element implements the data processing method in any one of the first aspect or the possible implementations of the first aspect. When the data processing apparatus is a chip in the data analytics network element, the processing unit may be a processor, and the communications unit may be collectively referred to as a communications interface. For example, the communications interface may be an input/output interface, a pin, or a circuit. The processing unit executes computer program code stored in the storage unit such that the data analytics network element implements the data processing method in any one of the first aspect or the possible implementations of the first aspect. The storage unit may be a storage unit (for example, a register or a cache) inside the chip, or may be a storage unit (for example, a read-only memory (ROM) or a random-access memory (RAM)) inside the data analytics network element and outside the chip.

Optionally, the processor, the communications interface, and the memory are coupled to each other.

According to a ninth aspect, this application provides a data processing apparatus. The data processing apparatus may implement the method in any one of the second aspect or the possible implementations of the second aspect, and therefore can also achieve the beneficial effects in any one of the second aspect or the possible implementations of the second aspect. The data processing apparatus may be a first network element, or may be an apparatus that can support the first network element in implementing the method in any one of the second aspect or the possible implementations of the second aspect, for example, a chip applied to the first network element. The apparatus may implement the foregoing method using software or hardware, or by executing corresponding software by hardware.

In an example, the data processing apparatus in this embodiment of this application includes a communications unit configured to obtain data of a terminal on the first network element, where the data of the terminal on the first network element includes a first identifier, and a sending unit configured to send the data of the terminal on the first network element to a data analytics network element. The first network element is an access network element. The first identifier includes any one or more of the following information an identifier assigned by the first network element to the terminal or an identifier assigned by a second network element to the terminal.

In a possible implementation, the first identifier further includes at least one of the following information an identifier of the terminal, an identifier of the first network element, an identifier of the second network element, a session identifier of the terminal, a flow identifier of the terminal, network instance information, and area information of the terminal.

In a possible implementation, the identifier assigned by the first network element to the terminal is an identifier assigned by the access network element to the terminal on a first interface. The identifier assigned by the second network element to the terminal is an identifier assigned by an AMF network element to the terminal on the first interface. The first interface is an interface between the access network element and the second network element.

In a possible implementation, the apparatus provided in this embodiment of this application further includes a receiving unit configured to receive a request from the data analytics network element through a network management network element or the AMF network element. The request is usable for requesting the data of the terminal on the first network element, and the request includes any one or more of the following information corresponding to the terminal the area information, time information, and a terminal type.

In a possible implementation, the receiving unit is further configured to receive, from the data analytics network element through the network management network element or the AMF network element, indication information used to indicate the first network element to report the first identifier.

In another example, the data processing apparatus provided in this embodiment of this application may be a first network element, or may be a chip in the first network element. The data processing apparatus may include a communications unit and a processing unit. When the data processing apparatus is a first network element, the communications unit may be an interface circuit. The data processing apparatus may further include a storage unit. The storage unit may be a memory. The storage unit is configured to store computer program code, and the computer program code includes an instruction. The processing unit may be a processor. The processing unit executes the instruction stored in the storage unit such that the first network element implements the data processing method in any one of the second aspect or the possible implementations of the second aspect. When the data processing apparatus is a chip in the first network element, the processing unit may be a processor, and the communications unit may be collectively referred to as a communications interface. For example, the communications interface may be an input/output interface, a pin, or a circuit. The processing unit executes computer program code stored in the storage unit such that the first network element implements the data processing method in any one of the second aspect or the possible implementations of the second aspect. The storage unit may be a storage unit (for example, a register or a cache) inside the chip, or may be a storage unit (for example, a ROM or a RAM) inside the first network element and outside the chip.

Optionally, the processor, the communications interface, and the memory are coupled to each other.

According to a tenth aspect, this application provides a data processing apparatus. The data processing apparatus may implement the method in any one of the third aspect or the possible implementations of the third aspect, and therefore can also achieve the beneficial effects in any one of the third aspect or the possible implementations of the third aspect. The data processing apparatus may be a data analytics network element, or may be an apparatus that can support the data analytics network element in implementing the method in any one of the third aspect or the possible implementations of the third aspect, for example, a chip applied to the data analytics network element. The apparatus may implement the foregoing method using software or hardware, or by executing corresponding software by hardware.

In an example, the data processing apparatus in this embodiment of this application includes a communications unit configured to obtain data of a terminal on a first network element, where the data of the terminal on the first network element includes a first identifier, where the communications unit is further configured to obtain data on a second network element, where the data on the second network element includes data of the terminal on the second network element, and the data of the terminal on the second network element includes the first identifier, and to processing unit configured to associate the data of the terminal on the first network element with the data of the terminal on the second network element based on the first identifier. The first network element is an access network element. The first identifier includes any one or more of the following information an identifier assigned by the first network element to the terminal or an identifier assigned by the second network element to the terminal.

In a possible implementation, the first identifier further includes at least one of the following information an identifier of the terminal, an identifier of the first network element, an identifier of the second network element, a session identifier of the terminal, a flow identifier of the terminal, network instance information, and area information of the terminal.

In a possible implementation, the flow identifier of the terminal is a service flow identifier of the terminal.

In a possible implementation, the second network element is a UPF network element.

In a possible implementation, the data of the terminal on the UPF network element further includes a fourth identifier, and the fourth identifier is usable for associating the data of the terminal on the UPF network element with data of the terminal on an AF network element. The communications unit is further configured to obtain the data of the terminal on the AF network element, where the data of the terminal on the AF network element includes the fourth identifier. The processing unit is further configured to associate the data of the terminal on the UPF network element with the data of the terminal on the AF network element based on the fourth identifier.

In a possible implementation, the fourth identifier may include at least one of the following information an IP 5-tuple, the identifier of the terminal, an identifier of the UPF network element, a service identifier of a service, an identifier of a service server, and an identifier of the AF network element.

In a possible implementation, the data of the terminal on the UPF network element further includes a third identifier used to associate data of the terminal on a SMF network element with the data of the terminal on the UPF network element. The communications unit is further configured to obtain the data of the terminal on the SMF network element, where the data of the terminal on the SMF network element includes the third identifier. The processing unit is further configured to associate the data of the terminal on the SMF network element with the data of the terminal on the UPF network element based on the third identifier.

In a possible implementation, the third identifier includes at least one of the following information an identifier assigned by the SMF network element to a session of the terminal, an identifier of the SMF network element, the identifier of the UPF network element, the session identifier of the terminal, the flow identifier of the terminal, and the identifier of the terminal.

In a possible implementation, the flow identifier of the terminal is a service flow identifier of the terminal.

In a possible implementation, the data of the terminal on the SMF network element further includes a second identifier, and the second identifier is usable for associating data of the terminal on an AMF network element with the data of the terminal on the SMF network element. The communications unit is further configured to obtain the data of the terminal on the AMF network element, where the data of the terminal on the AMF network element includes the second identifier. The processing unit is further configured to associate the data of the terminal on the AMF network element with the data of the terminal on the SMF network element based on the second identifier.

In a possible implementation, the second identifier includes at least one of the following information a session management context identifier of the terminal, an identifier of the AMF network element, the identifier of the SMF network element, a CGI, the identifier of the terminal, and the session identifier of the terminal.

In a possible implementation, the identifier assigned by the first network element to the terminal is an identifier assigned by the access network element to the terminal on a third interface, and the third interface is an interface between the access network element and the UPF network element. The identifier assigned by the second network element to the terminal is an identifier assigned by the UPF network element to the terminal on the third interface.

It should be understood that, for a process in which the communications unit is configured to obtain the data of the terminal on the first network element in the tenth aspect, refer to the description in the first aspect. Details are not described herein again.

In another example, the data processing apparatus provided in this embodiment of this application may be a data analytics network element, or may be a chip in the data analytics network element. The data processing apparatus may include a communications unit and a processing unit. When the data processing apparatus is a data analytics network element, the communications unit may be an interface circuit. The data processing apparatus may further include a storage unit. The storage unit may be a memory. The storage unit is configured to store computer program code, and the computer program code includes an instruction. The processing unit may be a processor. The processing unit executes the instruction stored in the storage unit such that the data analytics network element implements the data processing method in any one of the third aspect or the possible implementations of the third aspect. When the data processing apparatus is a chip in the data analytics network element, the processing unit may be a processor, and the communications unit may be collectively referred to as a communications interface. For example, the communications interface may be an input/output interface, a pin, or a circuit. The processing unit executes computer program code stored in the storage unit such that the data analytics network element implements the data processing method in any one of the third aspect or the possible implementations of the third aspect. The storage unit may be a storage unit (for example, a register or a cache) inside the chip, or may be a storage unit (for example, a ROM or a RAM) inside the data analytics network element and outside the chip.

Optionally, the processor, the communications interface, and the memory are coupled to each other.

According to an eleventh aspect, this application provides a data processing apparatus. The data processing apparatus may implement the method in any one of the fourth aspect or the possible implementations of the fourth aspect, and therefore can also achieve the beneficial effects in any one of the fourth aspect or the possible implementations of the fourth aspect. The data processing apparatus may be an AMF network element, or may be an apparatus that can support the AMF network element in implementing the method in any one of the fourth aspect or the possible implementations of the fourth aspect, for example, a chip applied to the AMF network element. The apparatus may implement the foregoing method using software or hardware, or by executing corresponding software by hardware.

In an example, the data processing apparatus provided in this embodiment of this application includes a processing unit configured to determine data of a terminal on the AMF network element, and a communications unit configured to send the data of the terminal on the AMF network element to a data analytics network element. The data of the terminal on the AMF network element includes a first identifier. The first identifier includes any one or more of the following information an identifier assigned by a first network element to the terminal and/or an identifier assigned by a second network element to the terminal. The first network element is an access network element, and the second network element is the AMF network element.

In a possible implementation, the first identifier further includes at least one of the following information an identifier of the terminal, an identifier of the first network element, an identifier of the second network element, a session identifier of the terminal, a flow identifier of the terminal, network instance information, and area information of the terminal.

In a possible implementation, the data of the terminal on the AMF network element further includes a second identifier, and the second identifier is usable for associating the data of the terminal on the AMF network element with data of the terminal on a SMF network element.

Specifically, for description of the second identifier, refer to the related description in the first aspect. Details are not described herein again.

In a possible implementation, the communications unit is further configured to receive a request message from the data analytics network element, where the request message is usable for requesting the data of the terminal on the AMF network element. For example, the request message includes any one or more of the following information the identifier of the terminal, a group identifier of the terminal, area information, time information, and a terminal type. In addition, in an optional implementation, the request message may further include an indication used to indicate the AMF network element to report the first identifier or the second identifier.

In another example, the data processing apparatus provided in this embodiment of this application may be an AMF network element, or may be a chip in the AMF network element. The data processing apparatus may include a communications unit and a processing unit. When the data processing apparatus is an AMF network element, the communications unit may be an interface circuit. The data processing apparatus may further include a storage unit. The storage unit may be a memory. The storage unit is configured to store computer program code, and the computer program code includes an instruction. The processing unit may be a processor. The processing unit executes the instruction stored in the storage unit such that the AMF network element implements the data processing method in any one of the fourth aspect or the possible implementations of the fourth aspect. When the data processing apparatus is a chip in the AMF network element, the processing unit may be a processor, and the communications unit may be collectively referred to as a communications interface. For example, the communications interface may be an input/output interface, a pin, or a circuit. The processing unit executes computer program code stored in the storage unit such that the AMF network element implements the data processing method in any one of the fourth aspect or the possible implementations of the fourth aspect. The storage unit may be a storage unit (for example, a register or a cache) inside the chip, or may be a storage unit (for example, a ROM or a RAM) inside the AMF network element and outside the chip.

Optionally, the processor, the communications interface, and the memory are coupled to each other.

According to a twelfth aspect, this application provides a data processing apparatus. The data processing apparatus may implement the method in any one of the fifth aspect or the possible implementations of the fifth aspect, and therefore can also achieve the beneficial effects in any one of the fifth aspect or the possible implementations of the fifth aspect. The data processing apparatus may be a SMF network element, or may be an apparatus that can support the SMF network element in implementing the method in any one of the fifth aspect or the possible implementations of the fifth aspect, for example, a chip applied to the SMF network element. The apparatus may implement the foregoing method using software or hardware, or by executing corresponding software by hardware.

In an example, the data processing apparatus provided in this embodiment of this application includes a processing unit configured to obtain data of a terminal on the SMF network element, and a communications unit configured to send the data of the terminal on the SMF network element to a data analytics network element. The data of the terminal on the SMF network element includes a second identifier, and the second identifier is usable for associating data of the terminal on an AMF network element with the data of the terminal on the SMF network element.

For specific content of the second identifier herein, refer to the related description in the first aspect. Details are not described herein again.

In a possible implementation, the data of the terminal on the SMF network element further includes a third identifier, and the third identifier is usable for associating the data of the terminal on the SMF network element with data of the terminal on a UPF network element.

For specific content of the third identifier herein, refer to the related description in the first aspect. Details are not described herein again.

In a possible implementation, the communications unit is further configured to receive a request message from the data analytics network element, where the request message is usable for requesting the data of the terminal on the SMF network element. For example, the request message includes any one or more of the following information an identifier of the terminal, a group identifier of the terminal, area information, time information, a terminal type, and service information. In addition, in an optional implementation, the request message may further include an indication used to indicate the SMF network element to report the second identifier or the third identifier.

In a possible implementation, the service information includes any one or more of the following information a service identifier, an IP address of a service server, a port number of the service server, a transport layer protocol of a service, media information, and a service priority.

In a possible implementation, the communications unit is configured to send a request message to the UPF network element, where the request message is usable for requesting the data of the terminal on the UPF network element. For example, the request message includes any one or more of the following information an identifier of the terminal, a group identifier of the terminal, area information, time information, a terminal type, and service information. In addition, in an optional implementation, the request message may further include an indication used to indicate the SMF network element to report the third identifier or a fourth identifier.

For specific content of the third identifier or the fourth identifier herein, refer to the related description in the first aspect. Details are not described herein again.

In another example, the data processing apparatus provided in this embodiment of this application may be a SMF network element, or may be a chip in the SMF network element. The data processing apparatus may include a communications unit and a processing unit. When the data processing apparatus is a SMF network element, the communications unit may be an interface circuit. The data processing apparatus may further include a storage unit. The storage unit may be a memory. The storage unit is configured to store computer program code, and the computer program code includes an instruction. The processing unit may be a processor. The processing unit executes the instruction stored in the storage unit such that the SMF network element implements the data processing method in any one of the fifth aspect or the possible implementations of the fifth aspect. When the data processing apparatus is a chip in the SMF network element, the processing unit may be a processor, and the communications unit may be collectively referred to as a communications interface. For example, the communications interface may be an input/output interface, a pin, or a circuit. The processing unit executes computer program code stored in the storage unit such that the SMF network element implements the data processing method in any one of the fifth aspect or the possible implementations of the fifth aspect. The storage unit may be a storage unit (for example, a register or a cache) inside the chip, or may be a storage unit (for example, a ROM or a RAM) inside the SMF network element and outside the chip.

Optionally, the processor, the communications interface, and the memory are coupled to each other.

According to a thirteenth aspect, this application provides a data processing apparatus. The data processing apparatus may implement the method in any one of the sixth aspect or the possible implementations of the sixth aspect, and therefore can also achieve the beneficial effects in any one of the sixth aspect or the possible implementations of the sixth aspect. The data processing apparatus may be an AF network element, or may be an apparatus that can support the AF network element in implementing the method in any one of the sixth aspect or the possible implementations of the sixth aspect, for example, a chip applied to the AF network element. The apparatus may implement the foregoing method using software or hardware, or by executing corresponding software by hardware.

In an example, the data processing apparatus includes a processing unit configured to obtain data of a terminal on the AF network element, and a communications unit configured to send the data of the terminal on the AF network element to a data analytics network element. The data of the terminal on the AF network element includes a fourth identifier, and the fourth identifier is usable for associating data of the terminal on a UPF network element with the data of the terminal on the AF network element.

For specific content of the fourth identifier herein, refer to the related description in the first aspect. Details are not described herein again.

In a possible implementation, the communications unit is configured to receive a request message from the data analytics network element, where the request message is usable for requesting the data of the terminal on the AF network element. For example, the request message includes any one or more of the following information an identifier of the terminal, a group identifier of the terminal, area information, a geographical area, time information, a terminal type, and service information. In addition, in an optional implementation, the request message may further include an indication used to indicate the AF network element to report the fourth identifier.

In a possible implementation, the service information includes any one or more of the following information a service identifier, an IP address of a service server, a port number of the service server, a transport layer protocol of a service, media information, and a service priority.

In another example, the data processing apparatus provided in this embodiment of this application may be an AF network element, or may be a chip in the AF network element. The data processing apparatus may include a communications unit and a processing unit. When the data processing apparatus is an AF network element, the communications unit may be an interface circuit. The data processing apparatus may further include a storage unit. The storage unit may be a memory. The storage unit is configured to store computer program code, and the computer program code includes an instruction. The processing unit may be a processor. The processing unit executes the instruction stored in the storage unit such that the AF network element implements the data processing method in any one of the sixth aspect or the possible implementations of the sixth aspect. When the data processing apparatus is a chip in the AF network element, the processing unit may be a processor, and the communications unit may be collectively referred to as a communications interface. For example, the communications interface may be an input/output interface, a pin, or a circuit. The processing unit executes computer program code stored in the storage unit such that the AF network element implements the data processing method in any one of the sixth aspect or the possible implementations of the sixth aspect. The storage unit may be a storage unit (for example, a register or a cache) inside the chip, or may be a storage unit (for example, a ROM or a RAM) inside the AF network element and outside the chip.

Optionally, the processor, the communications interface, and the memory are coupled to each other.

According to a fourteenth aspect, this application provides a data processing apparatus. The data processing apparatus may implement the method in any one of the seventh aspect or the possible implementations of the seventh aspect, and therefore can also achieve the beneficial effects in any one of the seventh aspect or the possible implementations of the seventh aspect. The data processing apparatus may be a UPF network element, or may be an apparatus that can support the UPF network element in implementing the method in any one of the seventh aspect or the possible implementations of the seventh aspect, for example, a chip applied to the UPF network element. The apparatus may implement the foregoing method using software or hardware, or by executing corresponding software by hardware.

In an example, the data processing apparatus includes a processing unit configured to obtain data of a terminal on the UPF network element, where the data of the terminal on the UPF network element includes a third identifier used to associate data of the terminal on a SMF network element with the data of the terminal on the UPF network element, and a communications unit configured to send the data of the terminal on the UPF network element to a data analytics network element.

For specific content of the third identifier, refer to the description in the first aspect. Details are not described herein again.

In a possible implementation, the data of the terminal on the UPF network element includes a fourth identifier used to associate the data of the terminal on the UPF network element with data of the terminal on an AF network element. For specific content of the fourth identifier, refer to the description in the first aspect. Details are not described herein again.

In a possible implementation, the communications unit is further configured to receive a request message from the data analytics network element or the SMF network element, where the request message is usable for requesting the data of the terminal on the UPF network element. For example, the request message includes any one or more of the following information an identifier of the terminal, a group identifier of the terminal, area information, time information, a terminal type, and service information. In addition, in an optional implementation, the request message may further include an indication used to indicate the UPF network element to report the third identifier or the fourth identifier.

In a possible implementation, the service information includes any one or more of the following information a service identifier, an IP address of a service server, a port number of the service server, a transport layer protocol of a service, media information, and a service priority.

In another example, the data processing apparatus provided in this embodiment of this application may be a UPF network element, or may be a chip in the UPF network element. The data processing apparatus may include a communications unit and a processing unit. When the data processing apparatus is a UPF network element, the communications unit may be an interface circuit. The data processing apparatus may further include a storage unit. The storage unit may be a memory. The storage unit is configured to store computer program code, and the computer program code includes an instruction. The processing unit may be a processor. The processing unit executes the instruction stored in the storage unit such that the UPF network element implements the data processing method in any one of the seventh aspect or the possible implementations of the seventh aspect. When the data processing apparatus is a chip in the UPF network element, the processing unit may be a processor, and the communications unit may be collectively referred to as a communications interface. For example, the communications interface may be an input/output interface, a pin, or a circuit. The processing unit executes computer program code stored in the storage unit such that the UPF network element implements the data processing method in any one of the seventh aspect or the possible implementations of the seventh aspect. The storage unit may be a storage unit (for example, a register or a cache) inside the chip, or may be a storage unit (for example, a ROM or a RAM) inside the UPF network element and outside the chip.

Optionally, the processor, the communications interface, and the memory are coupled to each other.

According to a fifteenth aspect, an embodiment of this application provides a computer readable storage medium. The computer readable storage medium stores a computer program or an instruction. When the computer program or the instruction is run on a computer, the computer is enabled to perform the data processing method in any one of the first aspect or the possible implementations of the first aspect.

According to a sixteenth aspect, an embodiment of this application provides a computer readable storage medium. The computer readable storage medium stores a computer program or an instruction. When the computer program or the instruction is run on a computer, the computer is enabled to perform the data processing method in any one of the second aspect or the possible implementations of the second aspect.

According to a seventeenth aspect, an embodiment of this application provides a computer readable storage medium. The computer readable storage medium stores a computer program or an instruction. When the computer program or the instruction is run on a computer, the computer is enabled to perform the data processing method in any one of the third aspect or the possible implementations of the third aspect.

According to an eighteenth aspect, an embodiment of this application provides a computer readable storage medium. The computer readable storage medium stores a computer program or an instruction. When the computer program or the instruction is run on a computer, the computer is enabled to perform the data processing method in any one of the fourth aspect or the possible implementations of the fourth aspect.

According to a nineteenth aspect, an embodiment of this application provides a computer readable storage medium. The computer readable storage medium stores a computer program or an instruction. When the computer program or the instruction is run on a computer, the computer is enabled to perform the data processing method in any one of the fifth aspect or the possible implementations of the fifth aspect.

According to a twentieth aspect, an embodiment of this application provides a computer readable storage medium. The computer readable storage medium stores a computer program or an instruction. When the computer program or the instruction is run on a computer, the computer is enabled to perform the data processing method in any one of the sixth aspect or the possible implementations of the sixth aspect.

According to a twenty-first aspect, an embodiment of this application provides a computer readable storage medium. The computer readable storage medium stores a computer program or an instruction. When the computer program or the instruction is run on a computer, the computer is enabled to perform the data processing method in any one of the seventh aspect or the possible implementations of the seventh aspect.

According to a twenty-second aspect, an embodiment of this application provides a computer program product including an instruction. When the instruction is run on a computer, the computer is enabled to perform the data processing method in the first aspect or the possible implementations of the first aspect.

According to a twenty-third aspect, an embodiment of this application provides a computer program product including an instruction. When the instruction is run on a computer, the computer is enabled to perform the data processing method in the second aspect or the possible implementations of the second aspect.

According to a twenty-fourth aspect, an embodiment of this application provides a computer program product including an instruction. When the instruction is run on a computer, the computer is enabled to perform the data processing method in the third aspect or the possible implementations of the third aspect.

According to a twenty-fifth aspect, an embodiment of this application provides a computer program product including an instruction. When the instruction is run on a computer, the computer is enabled to perform the data processing method in the fourth aspect or the possible implementations of the fourth aspect.

According to a twenty-sixth aspect, an embodiment of this application provides a computer program product including an instruction. When the instruction is run on a computer, the computer is enabled to perform the data processing method in the fifth aspect or the possible implementations of the fifth aspect.

According to a twenty-seventh aspect, an embodiment of this application provides a computer program product including an instruction. When the instruction is run on a computer, the computer is enabled to perform the data processing method in the sixth aspect or the possible implementations of the sixth aspect.

According to a twenty-eighth aspect, an embodiment of this application provides a computer program product including an instruction. When the instruction is run on a computer, the computer is enabled to perform the data processing method in the seventh aspect or the possible implementations of the seventh aspect.

According to a twenty-ninth aspect, an embodiment of this application provides a communications system. The communications system includes any one or more of the following the data processing apparatus in the eighth aspect and the possible implementations of the eighth aspect, the data processing apparatus in the ninth aspect and the possible implementations of the ninth aspect, and the data processing apparatus in the eleventh aspect and the possible implementations of the eleventh aspect.

Optionally, the communications system may further include the data processing apparatus in the twelfth aspect and the possible implementations of the twelfth aspect and the data processing apparatus in the thirteenth aspect and the possible implementations of the thirteenth aspect.

According to a thirtieth aspect, an embodiment of this application provides a communications system. The communications system includes any one or more of the following the data processing apparatus in the tenth aspect and the possible implementations of the tenth aspect, the data processing apparatus in the ninth aspect and the possible implementations of the ninth aspect, and the data processing apparatus in the eleventh aspect and the possible implementations of the eleventh aspect.

According to a thirty-first aspect, an embodiment of this application provides a communications apparatus. The communications apparatus includes a processor and a storage medium. The storage medium stores an instruction. When the instruction is run by the processor, the data processing method in the first aspect or the possible implementations of the first aspect is implemented.

According to a thirty-second aspect, an embodiment of this application provides a communications apparatus. The communications apparatus includes a processor and a storage medium. The storage medium stores an instruction. When the instruction is run by the processor, the data processing method in the second aspect or the possible implementations of the second aspect is implemented.

According to a thirty-third aspect, an embodiment of this application provides a communications apparatus. The communications apparatus includes a processor and a storage medium. The storage medium stores an instruction. When the instruction is run by the processor, the data processing method in the third aspect or the possible implementations of the third aspect is implemented.

According to a thirty-fourth aspect, an embodiment of this application provides a communications apparatus. The communications apparatus includes a processor and a storage medium. The storage medium stores an instruction. When the instruction is run by the processor, the data processing method in the fourth aspect or the possible implementations of the fourth aspect is implemented.

According to a thirty-fifth aspect, an embodiment of this application provides a communications apparatus. The communications apparatus includes a processor and a storage medium. The storage medium stores an instruction. When the instruction is run by the processor, the data processing method in the fifth aspect or the possible implementations of the fifth aspect is implemented.

According to a thirty-sixth aspect, an embodiment of this application provides a communications apparatus. The communications apparatus includes a processor and a storage medium. The storage medium stores an instruction. When the instruction is run by the processor, the data processing method in the sixth aspect or the possible implementations of the sixth aspect is implemented.

According to a thirty-seventh aspect, an embodiment of this application provides a communications apparatus. The communications apparatus includes a processor and a storage medium. The storage medium stores an instruction. When the instruction is run by the processor, the data processing method in the seventh aspect or the possible implementations of the seventh aspect is implemented.

It may be understood that the storage medium in the thirty-first aspect to the thirty-seventh aspect in the embodiments of this application may be replaced with a memory.

According to a thirty-eighth aspect, an embodiment of this application provides a communications apparatus. The communications apparatus includes one or more modules configured to implement the method in the first aspect, the second aspect, the third aspect, the fourth aspect, the fifth aspect, the sixth aspect, or the seventh aspect, and the one or more modules may correspond to the steps in the method in the first aspect, the second aspect, the third aspect, the fourth aspect, the fifth aspect, the sixth aspect, or the seventh aspect.

According to a thirty-ninth aspect, an embodiment of this application provides a chip. The chip includes a processor and a communications interface. The communications interface is coupled to the processor. The processor is configured to run a computer program or an instruction, to implement the data processing method in the first aspect or the possible implementations of the first aspect. The communications interface is configured to communicate with a module other than the chip.

According to a fortieth aspect, an embodiment of this application provides a chip. The chip includes a processor and a communications interface. The communications interface is coupled to the processor. The processor is configured to run a computer program or an instruction, to implement the data processing method in the second aspect or the possible implementations of the second aspect. The communications interface is configured to communicate with a module other than the chip.

According to a forty-first aspect, an embodiment of this application provides a chip. The chip includes a processor and a communications interface. The communications interface is coupled to the processor. The processor is configured to run a computer program or an instruction, to implement the data processing method in the third aspect or the possible implementations of the third aspect. The communications interface is configured to communicate with a module other than the chip.

According to a forty-second aspect, an embodiment of this application provides a chip. The chip includes a processor and a communications interface. The communications interface is coupled to the processor. The processor is configured to run a computer program or an instruction, to implement the data processing method in the fourth aspect or the possible implementations of the fourth aspect. The communications interface is configured to communicate with a module other than the chip.

According to a forty-third aspect, an embodiment of this application provides a chip. The chip includes a processor and a communications interface. The communications interface is coupled to the processor. The processor is configured to run a computer program or an instruction, to implement the data processing method in the fifth aspect or the possible implementations of the fifth aspect. The communications interface is configured to communicate with a module other than the chip.

According to a forty-fourth aspect, an embodiment of this application provides a chip. The chip includes a processor and a communications interface. The communications interface is coupled to the processor. The processor is configured to run a computer program or an instruction, to implement the data processing method in the sixth aspect or the possible implementations of the sixth aspect. The communications interface is configured to communicate with a module other than the chip.

According to a forty-fifth aspect, an embodiment of this application provides a chip. The chip includes a processor and a communications interface. The communications interface is coupled to the processor. The processor is configured to run a computer program or an instruction, to implement the data processing method in the seventh aspect or the possible implementations of the seventh aspect. The communications interface is configured to communicate with a module other than the chip.

Specifically, the chip provided in this embodiment of this application further includes a memory configured to store the computer program or the instruction.

Any apparatus, computer storage medium, computer program product, chip, or communications system provided above is configured to perform the corresponding method provided above. Therefore, for beneficial effects that can be achieved by the apparatus, computer storage medium, computer program product, chip, or communications system provided above, refer to beneficial effects of a corresponding solution in the corresponding method provided above. Details are not described herein again.

BRIEF DESCRIPTION OF DRAWINGS

FIG. 3A and FIG. 3B are a schematic flowchart of a data processing method according to an embodiment of this application.

FIG. 5A and FIG. 5B are a schematic flowchart of still another data processing method according to an embodiment of this application.

DESCRIPTION OF EMBODIMENTS

Figure 1:
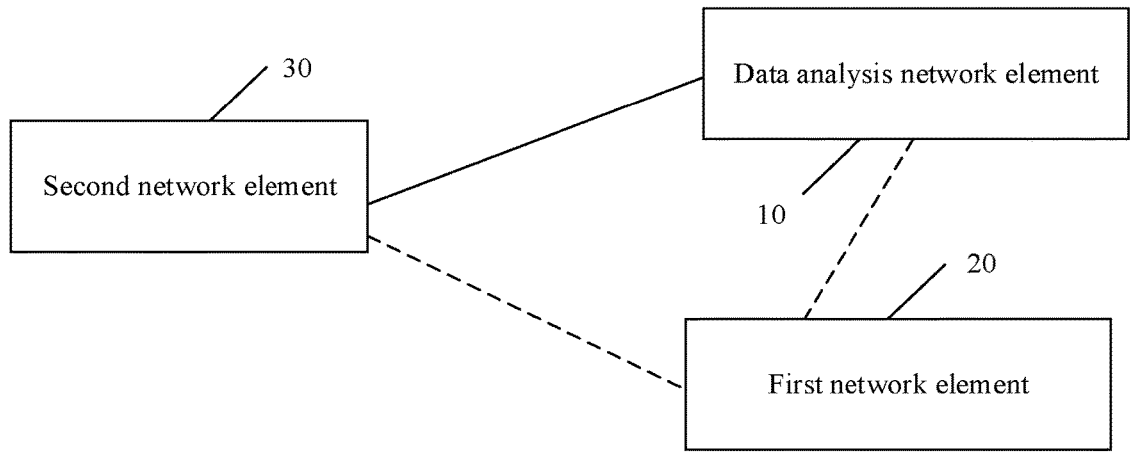
FIG. 1 is a schematic structural diagram of a communications system according to an embodiment of this application.

To clearly describe the technical solutions in the embodiments of this application, terms such as "first" and "second" are used in the embodiments of this application to distinguish between same items or similar items that have basically same functions and effects. For example, a first network element and a second network element are merely intended to distinguish between different network elements, and are not intended to limit a sequence thereof. A person skilled in the art may understand that the terms such as "first" and "second" do not limit a quantity or an execution sequence, and the terms such as "first" and "second" do not indicate a definite difference.

It should be noted that, in this application, the word "example" or "for example" is used to represent giving an example, an illustration, or a description. Any embodiment or design scheme described as an "example" or "for example" in this application should not be explained as being preferred or having more advantages than another embodiment or design scheme. Exactly, use of the word such as "example" or "for example" is intended to present a relative concept in a specific manner.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of the network architecture and emergence of new service scenarios, the technical solutions provided in the embodiments of this application are also applicable to similar technical problems.

In this application, "at least one" means one or more, and "a plurality of" means two or more. The term "and/or" describes an association relationship between associated objects and represents that three relationships may exist. For example, A and/or B may represent the following three cases only A exists, both A and B exist, and only B exists. A and B may be in a singular or plural form. The character "/" generally indicates an "or" relationship between the associated objects. "At least one of the following items" or a similar expression indicates any combination of the items, and includes any combination of a single item or a plurality of items. For example, at least one of a, b, or c may represent a, b, c, a and b, a and c, b and c, or a, b, and c, where a, b, and c may be in a singular or plural form.

The technical solutions in the embodiments of this application may be applied to various communications systems, for example, code-division multiple access (CDMA), time-division multiple access (TDMA), frequency division multiple access (FDMA), orthogonal frequency-division multiple access (OFDMA), single carrier frequency division multiple access (SC-FDMA), and another system. The terms "system" and "network" can be interchanged with each other. The CDMA system may implement wireless technologies such as universal terrestrial radio access (UTRA) and CDMA 2000. The UTRA may include a wideband CDMA (WCDMA) technology and another variation of CDMA. The CDMA 2000 may cover standards such as the interim standard (IS) 2000 (IS-2000), the IS-95, and the IS-856. The TDMA system may implement a wireless technology such as a global system for mobile communications (GSM). The OFDMA system may implement wireless technologies such as evolved universal terrestrial radio access (E-UTRA), ultra mobile broadband (UMB), Institute for Electrical and Electronics Engineers (IEEE) 802.11 (WI-FI), IEEE 802.16 (WiMAX), IEEE 802.20, and Flash OFDMA. The UTRA corresponds to a UMTS, and the E-UTRA corresponds to an evolved version of the UMTS. A new version of the UMTS that uses the E-UTRA is used in Long-Term Evolution (LTE) and various versions evolved based on LTE in 3rd Generation Partnership Project (3GPP). A 5G new radio (NR) communications system is a next-generation communications system under research. In addition, the communications system is further applicable to a future-oriented communications technology, and is applicable to the technical solutions provided in the embodiments of this application.

The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of the network architecture and emergence of new service scenarios, the technical solutions provided in the embodiments of this application are also applicable to similar technical problems. The embodiments of this application are described using an example in which a provided method is applied to an NR system or a 5G network.

FIG. 1 shows a communications system according to an embodiment of this application. The communications system includes a data analytics network element 10, a first network element 20, and a second network element 30. The data analytics network element 10, the first network element 20, and the second network element 30 may communicate with each other. The data analytics network element 10 and the first network element 20 may communicate with each other through another network element (for example, an AMF network element or a network management network element). For example, the network management network element may be an operation, administration, and maintenance (OAM) network element.

It should be understood that the communications system shown in FIG. 1 may further include another function network element in addition to the data analytics network element 10, the first network element 20, and the second network element 30.

For example, the first network element 20 is a network element in an access network. For example, the first network element 20 may be an access network element. The second network element 30 may be a terminal, a user plane network element in a CN, or a control plane network element in a CN. For example, the user plane network element may be a UPF network element. The control plane network element may be an AMF network element, a SMF network element, a PCF network element, or an AF network element. The AF network element may be an operator AF such as a proxy-call session control function (P-CSCF), or may be a third-party AF such as a TENCENT server or a WECHAT server.

It should be understood that, in the embodiments of this application, one or more terminals may access the CN through the access network. In the embodiments of the present disclosure, terminals may be distributed in an entire wireless network. Each terminal may be static or mobile.

It should be understood that an example in which the CN of the communications system is a 5G core network (5GC) is used in the foregoing description. In this case, the access network element may be an access device or a radio access network (RAN) in the 5G network, for example, a next generation NodeB (gNB). If a fourth generation (4G) CN (for example, an evolved packet core (EPC)) is used as the CN, the UPF network element may be replaced with a public data network (PDN) gateway (PGW) and a serving gateway (SGW), and the AMF network element and the SMF network element may be replaced with a mobility management entity (MME). The access network element may be an evolved NodeB (eNB), and the PCF network element may be a policy and charging rules function (PCRF) entity. In other words, in the 4G CN, the MME has both a SMF and a mobility management function.

For example, the access network element is a device that provides wireless access for the terminal. The access network element may be a RAN (for example, a next generation RAN (NG RAN)) device, or a wireline 5G access network (W-5GAN) device, for example, an access gateway function (AGF), a broadband network gateway (BNG), a WI-FI AP, or a WiMAX BS.

Figure 2:
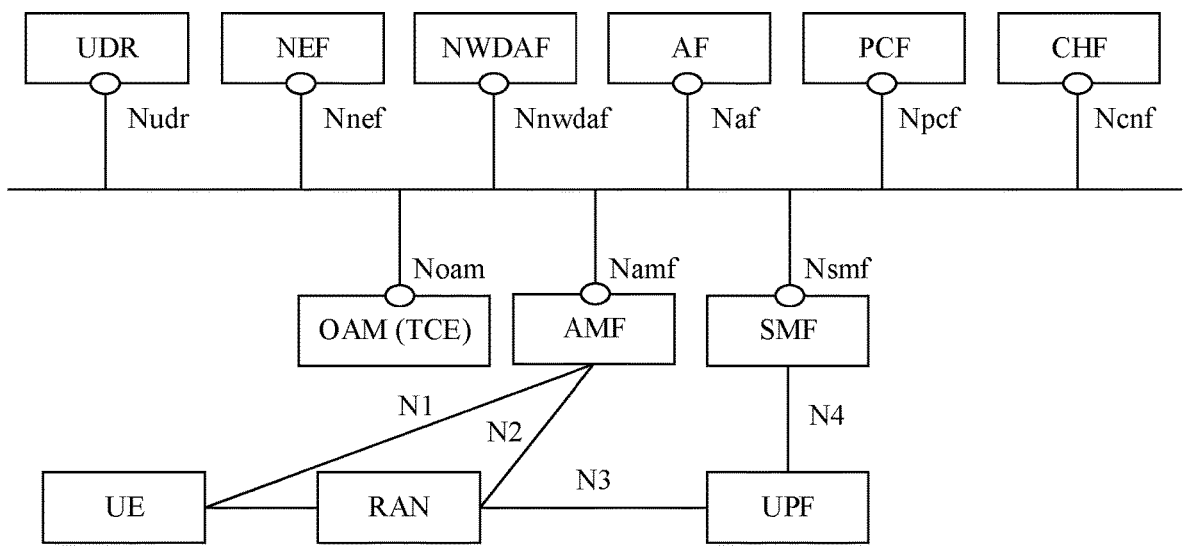
FIG. 2 is a schematic structural diagram of a 5G network according to an embodiment of this application.

In the 5G network, as shown in FIG. 2, the data analytics network element may be a NWDAF network element in the 5GC, a management data analytics function (MDAF) network element of a network management system, or even a data analytics network element on a RAN side. In addition to the SMF network element, the UPF network element, the RAN, the AMF network element, the PCF network element, and the AF network element, the communications system may further include a charging function (CHF) network element, an authentication server function (AUSF) network element, a network slice selection function (NSSF) network element, a network exposure function (NEF) network element, a user data repository (UDR), a unified data management (UDM) network element, a data network (DN), and a network repository function (NRF) network element. The NRF network element is not shown in the architectural diagram, and the NRF network element is mainly used for network element discovery.

The terminal communicates with the AMF network element through an N1 interface (N1). The AMF entity communicates with the SMF network element through an N11 interface (N11). The SMF network element communicates with one or more UPF network elements through an N4 interface (N4). Any two of the one or more UPF network elements communicate with each other through an N9 interface (N9). The UPF network element communicates, through an N6 interface (N6), with the DN managed and controlled by the AF network element. The terminal accesses a network through an access device (for example, a RAN device), and the access device communicates with the AMF network element through an N2 interface (N2). The SMF network element communicates with the PCF network element through an N7 interface (N7), and the PCF network element communicates with the AF network element through an N5 interface. The access device communicates with the UPF network element through an N3 interface (N3). Any two AMF network elements communicate with each other through an N14 interface (N14). The SMF network element communicates with the UDM network element through an N10 interface (N10). The AMF network element communicates with the AUSF network element through an N12 interface (N12). The AUSF network element communicates with the UDM network element through an N13 interface (N13). The AMF network element communicates with the UDM network element through an N8 interface (N8).

It should be understood that, in the network architecture shown in FIG. 2, the control plane network elements may alternatively interact with each other through a service-oriented interface. For example, the AMF network element, the SMF network element, the UDM network element, or the PCF network element interact with each other through a service-oriented interface. For example, an external service-oriented interface provided by the AMF network element may be Namf. An external service-oriented interface provided by the SMF network element may be Nsmf. An external service-oriented interface provided by the UDM network element may be Nudm. An external service-oriented interface provided by the PCF network element may be Npcf. It should be understood that, for related descriptions of names of various service-oriented interfaces, refer to a diagram of a 5G system architecture in the 23501 standard. Details are not described herein.

It should be noted that FIG. 2 merely schematically shows one UPF network element and one SMF network element. Certainly, there may be a plurality of UPF network elements and a plurality of SMF network elements, for example, an SMF network element 1 and an SMF network element 2. This is not specifically limited in the embodiments of this application.

It should be noted that the access device, the AMF network element, the SMF network element, the UDM network element, the UPF network element, the PCF network element, and the like in FIG. 2 are merely names, and the names constitute no limitation on the devices. In the 5G network and another future network, network elements corresponding to the access device, the AMF network element, the SMF network element, the UDM network element, the UPF network element, and the PCF network element may have other names. This is not specifically limited in the embodiments of this application. For example, the UDM network element may be further replaced with a home subscriber server (HSS), a user subscription database (USD), or a database entity. This is uniformly described herein. Details are not described subsequently.

The AMF network element is mainly responsible for mobility management in a mobile network, such as user location update, registration of a user with a network, and user switching.

The SMF network element is mainly responsible for session management in the mobile network, such as session establishment, session modification, and session release. For example, specific functions are assigning an IP address to a user, and selecting a UPF network element that provides a packet forwarding function.

The PCF network element is responsible for providing a policy such as a quality of service (QoS) policy or a slice selection policy for the AMF network element and the SMF network element.

The UDM network element is configured to store user data such as subscription information and authentication/authorization information.

The UPF network element is mainly responsible for performing processing such as forwarding and charging on a packet of a user.

The DN is an operator network that provides a data transmission service for a user, for example, an IP multimedia service (IMS) and an internet.

The terminal accesses the DN by establishing a session (PDU session) that is from the terminal to the DN and that passes through the RAN and the UPF network element.

The terminal is a device that provides voice and/or data connectivity for a user, for example, a handheld device or a vehicle-mounted device with a wireless connection function. The terminal may also be referred to as user equipment (UE), an access terminal, a user unit, a user station, a mobile station, a mobile console, a remote station, a remote terminal, mobile equipment, a user terminal, wireless telecom equipment, a user agent, user equipment, or a user apparatus. The terminal may be a station (STA) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, a wearable device, a terminal in a next generation communications system (for example, a 5G communications network), a terminal in a future evolved public land mobile network (PLMN), or the like. 5G may also be referred to as NR.

For example, in the embodiments of this application, the terminal may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is not merely a hardware device, but is used to implement powerful functions through software support, data exchange, and cloud interaction. Generalized wearable intelligent devices include full-featured and large-size devices that can implement all or some functions without depending on smartphones, such as smart watches or smart glasses, and devices that focus on only one type of AF and need to work with other devices such as smartphones, such as various smart bands or smart jewelry for monitoring physical signs.

It should be understood that the RAN device and the terminal may be deployed on land, including indoor or outdoor, or the RAN device and the terminal may be handheld, or vehicle-mounted. The RAN device and the terminal may alternatively be deployed on water, or be deployed on an aircraft, a balloon, and a satellite in the air. An application scenario of the RAN device and the terminal is not limited in this embodiment of this application.

Before performing data analysis, the NWDAF network element needs to collect data from different network elements. For example, the NWDAF network element feeds back service experience (that is, a service mean opinion score (MOS)) to the PCF network element to adjust a QoS parameter, and the NWDAF network element feeds back load information of the UPF network element to the SMF network element to assist in adjusting a flow path. However, the service MOS of the terminal is affected by a time-varying parameter of the terminal on each network element, such as radio channel quality, a bandwidth, a latency, a packet loss rate, a jitter buffer, a transmission control protocol (TCP) congestion window, or a TCP receive window on the terminal, radio channel quality, a bandwidth, a latency, a packet loss rate, or a congestion level on an access network air interface, a user plane bandwidth or user plane load information on the CN side, or a TCP congestion window, a TCP receive window, a media coding type, or a coding rate on a service layer. Therefore, to accurately obtain the service experience of the terminal, data of the terminal on different network elements needs to be learned in time.

For example, to measure the service MOS, the NWDAF network element first needs to collect data from different network elements (as shown in Table 1), and then train the data to obtain a service MOS model. The NWDAF network element may obtain, through measurement based on the service MOS model obtained through training and new network data, a service MOS corresponding to the new network data. The service MOS model is as follows $h(x) = w_0 x_0 + w_1 x_1 + w_2 x_2 + w_3 x_3 + w_4 x_4 + w_5 x_5 \ldots + w_{D2} x_{D1}$. $h(x)$ represents the service experience, that is, the service MOS. $x_i$ ($i=0, 1, 2, 3, \ldots, D1$) represents the network data. Referring to Table 1, D1 is a dimension of the network data. $w_i$ ($i=0, 1, 2, 3, \ldots, D2$) is a weight of affecting the service experience by each piece of network data, and D2 is a dimension of the weight.

TABLE 1

Data that needs to be trained to obtain the service MOS model by the NWDAF

| Data | Type | Granularity | Data source | Use |
|---|---|---|---|---|
| Location or area information | Network data | Terminal (UE) | AMF network element/RAN | Service MOS model training |
| Radio signal received power (RSRP) or radio signal received quality (RSRQ), power headroom, received signal strength indicator (RSSI), and round trip time (RTT) | Minimization of drive test (MDT) data | | RAN | |
| Received interference power | MDT data | | | |
| >Data network name (DNN) | Network data | Session | SMF network element/AMF network element | Determine a specific DNN to which a service belongs |
| >Single network slice selection assistance information (S-NSSAI) | Network data | | | Determine a specific slice to which a service belongs |
| >Network slice instance information (NSI) | Network data | | | Determine a specific slice instance to which service data belongs |
| >>Service identifier (Application ID) | Service data | Service (Application) | AF network element/PCF network element | Service identifier |
| >>Service experience | Service data | | AF | Service experience and service MOS model training |
| >>IP 5-tuple | Service/ Network data | | AF/UPF | Identify a service flow |
| >>Quality of service flow bit rate, packet delay, and packet error rate | Network data | | UPF | Service MOS model training |

TABLE 1-continued

Data that needs to be trained to obtain the service MOS model by the NWDAF

| Data | Type | Granularity | Data source | Use |
|---|---|---|---|---|
| >>Data volume for uplink/downlink, scheduled IP throughput for uplink/downlink, packet delay for downlink, and packet loss rate for uplink/downlink | MDT data | | RAN | Service MOS model training |
| >>Average throughput, initial playout delay, buffer level, play list, media playout description information(, MPD Information), playout delay for media start-up, and device information | Quality of Experience (QoE) data | | | |

It should be noted that the data listed in Table 1 is not only used for service MOS model training and service MOS measurement, but also used for other data analysis. For example, the NWDAF network element analyzes load information of a network element to assist in network element selection.

It may be understood that, in the embodiments of this application, steps performed by a data analytics network element in a data processing method may alternatively be performed by a chip applied to the data analytics network element, and steps performed by a first network element in the data processing method may alternatively be performed by a chip applied to the first network element. Steps performed by a second network element in a data processing method may alternatively be performed by an apparatus applied to the second network element, for example, a chip. The following embodiments are described using an example in which the data processing method is separately performed by the data analytics network element, the first network element, and the second network element.

Figure 3A:
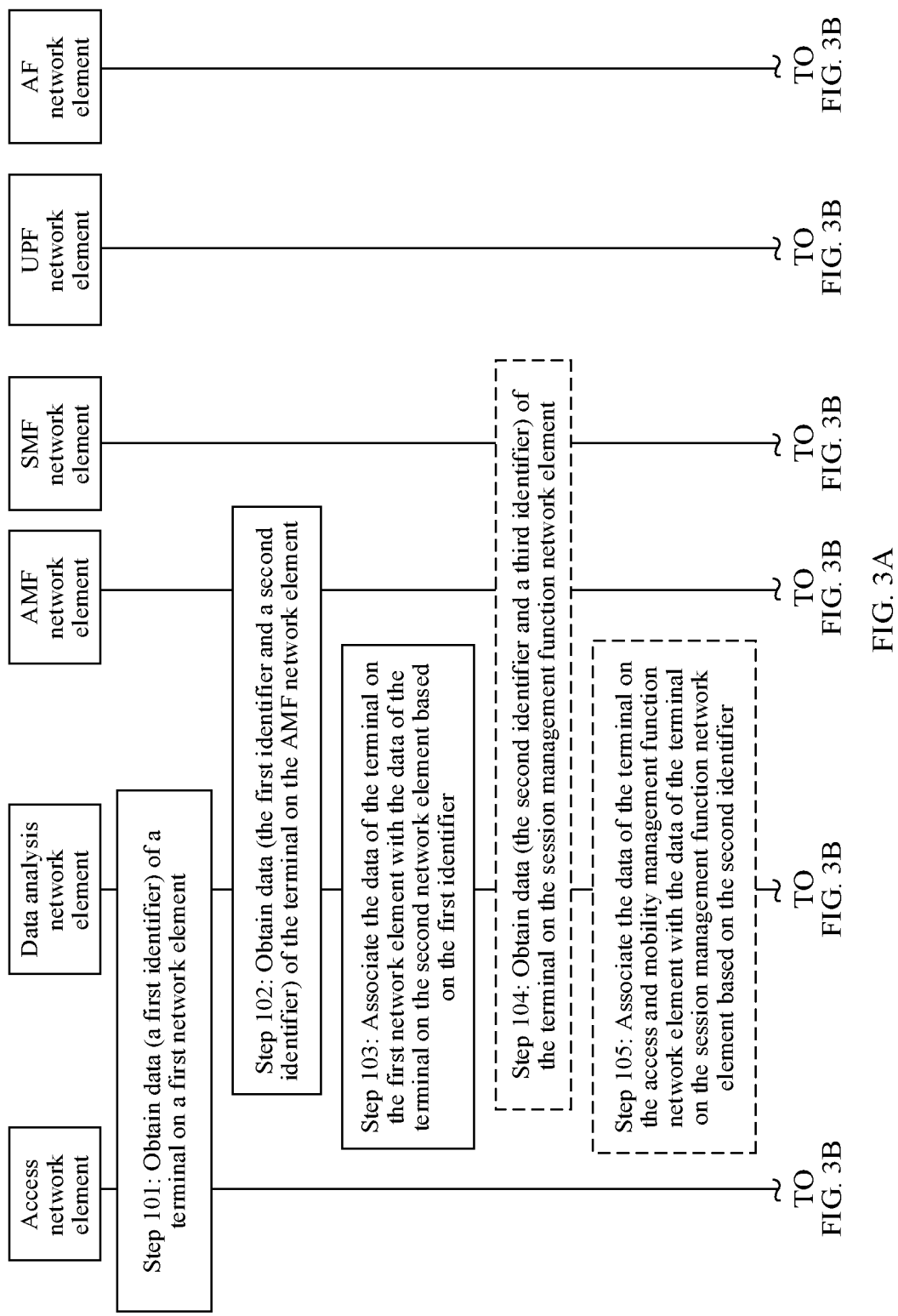

As shown in FIG. 3A and FIG. 3B, an embodiment of this application provides a data processing method. The method includes the following steps.

Step 101. A data analytics network element obtains data of a terminal on a first network element. The data of the terminal on the first network element includes a first identifier, and the first network element is an access network element. The first identifier includes any one or more of the following information an identifier assigned by the first network element to the terminal and/or an identifier assigned by a second network element to the terminal.

It should be understood that the first identifier includes the identifier assigned by the first network element to the terminal, or the first identifier includes the identifier assigned by the second network element to the terminal, or the first identifier includes the identifier assigned by the first network element to the terminal and the identifier assigned by the second network element to the terminal.

For example, the first network element is the access network element. In this case, the data of the terminal on the first network element may be MDT data or another type of data (for example, service experience QoE data, which is reported by the terminal, forwarded by the first network element, and finally sent to an OAM network element). For example, for the MDT data of the terminal, refer to Table 1.

Step 102. The data analytics network element obtains data on the second network element. The data on the second network element includes data of the terminal on the second network element, and the data of the terminal on the second network element includes the first identifier.

In this embodiment of this application, the second network element may be one of an AMF network element, a UPF network element, a SMF network element, a PCF network element, an AF network element, and a terminal. If the second network element is the AMF network element, the data of the terminal on the AMF network element may include location information of the terminal or area information of the terminal. For this, refer to Table 1. If the second network element is the SMF network element, the data of the terminal on the SMF network element may include session data of the terminal. For example, the session data of the terminal may be a DNN, S-NSSAI, an IP address, or NSI. For this, refer to Table 1.

For example, if the second network element is the UPF network element, the data of the terminal on the UPF network element may be referred to as QoS flow data of the terminal. For example, the QoS flow data may be a QoS flow bit rate, a packet delay, or a packet error rate. For this, refer to Table 1.

For example, if the second network element is the AF network element, the data of the terminal on the AF network element may also be referred to as service data. For example, the service data includes a service identifier, service experience, and a TCP sliding window size. For this, refer to Table 1.

For example, if the second network element is the terminal, the data of the terminal includes central processing unit (CPU) usage, memory usage, a foreground service identifier, and a background service identifier.

For example, if the second network element is the PCF network element, the data of the terminal on the PCF network element includes a DNN, S-NSSAI, an IP address, and NSI. For this, refer to Table 1.

For example, if the second network element is the AMF network element, in this embodiment of this application, the identifier assigned by the first network element to the terminal is an identifier assigned by the access network element to the terminal on a first interface, where the first interface is an interface between the access network element and the AMF network element, and the identifier assigned by the second network element to the terminal is an identifier assigned by the AMF network element to the terminal on the first interface. For example, the first interface may be an N2 interface. In other words, the access network element and the AMF network element each assign a unique identifier to the terminal on the N2 interface. For example, the identifier assigned by the access network element to the terminal on the N2 interface is a RAN UE next generation application protocol identifier (RAN UE NGAP ID), and the identifier assigned by the AMF network element to the terminal on the N2 interface is an AMF UE next generation application protocol identifier (AMF UE NGAP ID). The identifier assigned by the access network element to the terminal on the N2 interface is used to uniquely identify a RAN tunnel identifier of the terminal, and the identifier assigned by the AMF network element to the terminal on the N2 interface is used to uniquely identify an AMF tunnel identifier of the terminal.

For example, if the second network element is the UPF network element, the first interface may be the N3 interface between the RAN and the UPF network element in the system shown in FIG. 2. To be specific, the access network element and the UPF network element each assign an identifier, access network tunnel information, and CN tunnel information to the terminal on the N3 interface. The access network tunnel information includes an IP address of the RAN and a tunnel endpoint identifier (TEID) assigned by the RAN to a session of the terminal. The CN tunnel information includes an IP address of the UPF network element and a TEID assigned by the SMF network element or the UPF network element to a session of the terminal.

For example, if the second network element is the terminal, the first interface may be a Uu interface between the RAN and the terminal in the system shown in FIG. 2. In other words, the terminal and the access network element each assign an identifier to the terminal on the Uu interface. The identifier assigned by the access network element to the terminal on the Uu interface may be a cell radio network temporary identifier (C-RNTI).

It should be noted that, after assigning the identifier to the terminal on the first interface, the access network element may send, to the second network element (for example, the AMF network element, the terminal, or the UPF network element), the identifier assigned by the access network element to the terminal on the first interface. After assigning the identifier to the terminal on the first interface, the second network element may also send, to the access network element, the identifier assigned by the second network element to the terminal on the first interface.

In a specific implementation, before the data analytics network element performs step 102, the method provided in this embodiment of this application further includes querying, by the data analytics network element, an identifier of the second network element from an NRF network element. For example, the data analytics network element sends a query request to the NRF network element. The query request includes at least one of the following information area information, a data analytic result identifier (Analytic ID), a terminal group identifier, and a terminal type.

Step 103. The data analytics network element associates the data of the terminal on the first network element with the data of the terminal on the second network element based on the first identifier.

It should be understood that the data of the terminal on the first network element and the data of the terminal on the second network element carry the first identifier such that the data analytics network element can associate the data of the terminal on the first network element with the data of the terminal on the second network element based on the first identifier.

It should be understood that the access network element is unaware of an identifier of the terminal, and therefore cannot associate the data of the terminal on the access network element with the data on the second network element based on the identifier of the terminal. However, there is an interface between the access network element and the second network element (for example, the AMF network element, the terminal, or the UPF network element). Therefore, the data of the terminal on the access network element may be associated with the data on the second network element based on an identifier assigned by the access network element to the terminal on the interface and/or an identifier assigned by the second network element to the terminal on the interface.

In an optional implementation, the first identifier in this embodiment of this application further includes at least one of the following information an identifier of the terminal, an identifier of the first network element, an identifier of the second network element, a session identifier of the terminal, a flow identifier of the terminal, network instance information, and area information of the terminal.

In a possible implementation, the flow identifier of the terminal is a service flow identifier of the terminal.

The identifier of the first network element may be used to identify the first network element. For example, if the first network element is the access network element, the identifier of the first network element is a global RAN node identifier (global RAN node ID), a global next generation node identifier (global gNB ID), or an IP address of the RAN. If an IP address of the first network element is an internal IP address, the network instance information and the IP address are required to uniquely identify the first network element.

The identifier of the second network element may be used to identify the second network element. For example, if the second network element is the AMF network element, the identifier of the second network element is a global unique AMF identifier (GUAMI) or an IP address of the AMF network element. For example, if the second network element is the UPF network element, the identifier of the second network element is a global UPF network element identifier (global UPF ID) or an IP address of the UPF network element. For example, if the second network element is the terminal, the identifier of the second network element is an identifier of the terminal. If an IP address of the second network element is an internal IP address, the network instance information and the IP address are required to uniquely identify the first network element.

It should be understood that the identifier assigned by the first network element to the terminal is unique in the first network element, and the identifier assigned by the second network element to the terminal is unique only in the second network element. Therefore, for example, the data of the terminal on the first network element can be correctly associated with the data on the second network element (including the data of the terminal on the second network element) only using both the identifier of the first network element and the identifier of the second network element.

The session identifier of the terminal may be used to identify a session of the terminal. The session of the terminal may be a packet data unit (PDU) session in a 5G network or a PDN connection in a 4G network. For example, the session identifier of the terminal may be a PDU session ID. For example, the session identifier of the terminal may be a default bearer identifier (ID) in the PDN connection.

The flow identifier of the terminal is used to identify a service flow of the terminal. For example, the flow identifier of the terminal may be a QoS flow identifier (QoS Flow ID). For example, the flow identifier of the terminal may be a bearer identifier (Bearer ID). For example, the flow identifier of the terminal may alternatively be a service data flow identifier (SDF ID).

It should be noted that an identifier of any network element (for example, the first network element, the second network element, the AMF network element, the SMF network element, or the UPF network element) in this embodiment of this application is specifically an ID of the network element or an IP address of the network element.

For example, the identifier of the terminal in this embodiment of this application may be one or more of the following an IP address, a subscription permanent identifier (SUPI), a permanent equipment identifier (PEI), a generic public subscription identifier (GPSI), an international mobile subscriber identity (IMSI), an international mobile equipment identity (IMEI), an IP address, and a mobile station international integrated service digital network number (MSISDN). For an identifier of a terminal in the following embodiments, refer to the description herein. Details are not described subsequently.

For example, the area information of the terminal in this embodiment of this application may be one or more of the following information about an area in which the terminal is located a tracking area identifier (TAI), a TAI list (a list of TAIs), a routing area identifier (RAI), a RAI list (a list of RAI(s)), a cell identifier (Cell ID), a cell identifier list (a list of Cell ID(s)), a geographical area identifier, a network code (NC), a country code (CC), a city code, and a county code. For area information of a terminal in the following embodiments, refer to the description herein. Details are not described subsequently.

The identifier of the access network element is used to uniquely identify the access network element. For example, the identifier of the access network element may be a global RAN Node ID, which uniquely identifies a RAN globally. For example, if the second network element is the AMF network element, the data analytics network element may associate the data of the terminal on the access network element with the data of the terminal on the AMF network element based on the first identifier.

The following embodiment uses an example in which the second network element is the AMF network element to describe a process in which the data analytics network element associates the data of the terminal on the AMF network element, and data of the terminal on a SMF network element. A specific process is as follows.

To associate the data of the terminal on the AMF network element with the data of the terminal on the SMF network element, the data of the terminal on the AMF network element further includes a second identifier used to associate the data of the terminal on the AMF network element with the data of the terminal on the SMF network element. A session management context identifier is a session identifier uniquely assigned by the SMF network element to the terminal, and identifies a unique session in the SMF network element. The session management context ID is assigned by the SMF network element to a session of the terminal, and then is sent to the AMF network element to identify the session information of the terminal. Still with reference to FIG. 3A and FIG. 3B, in a possible embodiment, the method provided in this embodiment of this application further includes the following steps.

Step 104. The data analytics network element obtains the data of the terminal on the SMF network element. The data of the terminal on the SMF network element includes the second identifier.

Step 105. The data analytics network element associates the data of the terminal on the AMF network element with the data of the terminal on the SMF network element based on the second identifier.

According to the data processing method provided in this embodiment of this application, the data analytics network element obtains the data of the terminal on the first network element and the data of the terminal on the second network element. The data analytics network element associates the data of the terminal on the first network element with the data of the terminal on the second network element based on the first identifier such that the data analytics network element subsequently obtains, using a big data analytics technology, a data analytics result based on associated data of the terminal on at least two network elements.

It should be understood that, after performing step 101 to step 105, the data analytics network element may associate the data of the terminal on the access network element with the data of the terminal on the AMF network element based on the first identifier, and associate the obtained data with the data of the terminal on the SMF network element based on the second identifier.

For example, the data of the terminal on the AMF network element may be any one or more of location information, a DNN, NSI, and S-NSSAI of the terminal shown in Table 1. For example, the location information may be geographical location information or area information of the terminal. The data of the terminal on the SMF network element may be any one or more of the DNN, the S-NSSAI, and the NSI shown in Table 1. It may be understood that the data of the terminal on the SMF network element may be the same as or different from the data of the terminal on the AMF network element. That the data of the terminal on the SMF network element is different from the data of the terminal on the AMF network element means that the data of the terminal on the SMF network element is the same as a part of data and is different from a part of data in the data of the terminal on the AMF network element.

It should be noted that, although the data of the terminal on the SMF network element and the data of the terminal on the AMF network element may be data of a same type, the data of the terminal on the SMF network element and the data of the terminal on the AMF network element may alternatively be different due to different information collection ranges (for example, different time windows or different area information). For example, the type is a DNN. If the data of the terminal on the SMF network element and the data of the terminal on the AMF network element are DNNs, the DNN of the terminal on the SMF network element may be a DNN corresponding to the terminal in a time period 1, and the DNN of the terminal on the AMF network element may be a DNN corresponding to the terminal in a time period 2. In this way, the data analytics network element can associate data of the terminal on different network elements in different collection ranges based on the first identifier, to obtain a complete dataset of the terminal. For an example in which the type is S-NSSAI or NSI, refer to the example in which the type is the DNN. Details are not described in this embodiment of this application again.

In a possible example, the second identifier in this embodiment of this application includes at least one of the following information a session management context identifier (SM Context ID) of the terminal, an identifier of the AMF network element, an identifier of the SMF network element, a CGI, the identifier of the terminal, and the session identifier of the terminal. The CGI is used to uniquely identify a cell globally, that is, a cell in which the terminal is located.

For example, the identifier of the SMF network element may be an address of the SMF network element or an SMF ID. The SMF ID is used to uniquely identify the SMF globally.

It should be understood that the SM Context ID of the terminal is unique only in the SMF network element. Therefore, optionally, the data of the terminal on the AMF network element can be correctly associated with the data of the terminal on the SMF network element only using both the SM Context ID of the terminal and at least one of the identifier of the SMF network element or the identifier of the AMF network element.

To associate the data of the terminal on the SMF network element with data of the terminal on a UPF network element, in this embodiment of this application, the data of the terminal on the SMF network element further includes a third identifier used to associate the data of the terminal on the SMF network element with the data of the terminal on the UPF network element. Still with reference to FIG. 3A and FIG. 3B, in another possible embodiment, the method provided in this embodiment of this application further includes the following steps.

Step 106. The data analytics network element obtains the data of the terminal on the UPF network element. The data of the terminal on the UPF network element includes the third identifier.

For example, the third identifier includes at least one of the following information an identifier assigned by the SMF network element to a session of the terminal, the identifier of the SMF network element, an identifier of the UPF network element, the session identifier of the terminal, the flow identifier of the terminal, and the identifier of the terminal.

For example, the identifier assigned by the SMF network element to the session of the terminal is an identifier assigned by the SMF network element to the session of the terminal on a second interface, and the second interface is an interface between the SMF network element and the UPF network element. For example, as shown in FIG. 2, the interface between the SMF network element and the UPF network element may be the N4 interface, and the identifier assigned by the SMF network element to the session of the terminal on the second interface is an N4 session ID.

For example, the data of the terminal on the UPF network element may be QoS flow data, shown in Table 1, when the terminal uses a specific service. The QoS flow data may be a QoS flow bit rate, a packet loss rate (Packet Delay), and a packet error rate.

For example, in step 106, the data analytics network element may obtain the data of the terminal on the UPF network element in the following manner. (A). a1. The data analytics network element sends a data request message to the UPF network element through the SMF network element. b1. After the SMF network element receives the data request message from the data analytics network element, the SMF network element sends the data request message to the UPF network element through an N4 message. c1. The UPF network element obtains the data of the terminal on the UPF network element based on the data request message. d1. The UPF network element reports the data of the terminal on the UPF network element to the data analytics network element through a service-oriented interface. (B). a1 to c1 and d2 are included. d2. The UPF network element reports the data of the terminal on the UPF network element to the SMF network element through an N4 message, and the SMF network element further reports the data of the terminal on the UPF network element to the data analytics network element through a service-based interface. (C). The data analytics network element directly sends a data request message to the UPF network element.

Step 107. The data analytics network element associates the data of the terminal on the SMF network element with the data of the terminal on the UPF network element based on the third identifier.

It should be understood that the identifier, that is, the N4 session ID assigned by the SMF network element to the session of the terminal on the second interface is unique only in the SMF network element. Therefore, for example, the data of the terminal on the SMF network element can be correctly associated with the data of the terminal on the UPF network element only using both the N4 Session ID of the terminal and at least one of the identifier of the SMF network element or the identifier of the UPF network element.

To associate the data of the terminal on the UPF network element with data of the terminal on an AF network element, in this embodiment of this application, the data of the terminal on the UPF network element includes a fourth identifier used to associate the data of the terminal on the UPF network element with the data of the terminal on the AF network element. Still with reference to FIG. 3A and FIG. 3B, in still another possible embodiment, the method provided in this embodiment of this application further includes the following steps.

Step 108. The data analytics network element obtains the data of the terminal on the AF network element. The data of the terminal on the AF network element includes the fourth identifier.

For example, the data of the terminal on the AF network element may be service experience data shown in Table 1.

For example, a specific process in which the data analytics network element obtains the data of the terminal on the AF network element in step 108 may be as follows.

The AF network element first registers or configures an AF data address in the data analytics network element.

1. The data analytics network element subscribes or unsubscribes to the data of the terminal on the AF network element through an NEF network element.

The data analytics network element first initiates an Nnef_EventExposure_Subscribe or Nnef_EventExposure_Unsubscribe service operation to the NEF network element. Each data type is identified by an event. In a subscription service operation, area information and time information of collected data, a data reporting period, a trigger condition, and the like may be limited.

The area information may be one or more of the following information a tracking area (which corresponds to a TAI), a tracking area list (list of tracking areas (TAs), which corresponds to a list of TAI(s)), a routing area (which corresponds to an RAI), a routing area list (list of routing areas (RAs), which corresponds to a list of RAI(s)), a cell (which corresponds to a cell ID), a cell list (which corresponds to a list of cell ID(s)), geographical area (which corresponds to a geographical area identifier), a mobile NC, a mobile CC, a city code, and a county code. In this embodiment, for an area in a data request or a data subscription request that is sent by the data analytics network element to any other network element, refer to the description herein. Details are not described subsequently.

The time information may be one or more of the following information a time period, a time interval, a slot, a time window, a timestamp, and a time point. In this embodiment, for time information in a data request or a data subscription request that is sent by the data analytics network element to any other network element, refer to the description herein. Details are not described subsequently.

2. The NEF network element further subscribes to the data of the terminal on the AF network element from the AF network element using an Naf_EventExposure_Subscribe or Naf_EventExposure_Unsubscribe service operation.

3. The AF network element first sends the data of the terminal on the AF network element to the NEF network element using an Naf_EventExposure_Notify service operation.

4. The NEF network element sends, to the data analytics network element, an Nnef_EventExposure_Notify service operation that carries the data of the terminal on the AF network element.

Step 109. The data analytics network element associates the data of the terminal on the UPF network element with the data of the terminal on the AF network element based on the fourth identifier.

For example, the fourth identifier in this embodiment of this application may include at least one of the following information an IP 5-tuple, the identifier of the terminal, the identifier of the UPF network element, a service identifier of a service, an identifier of a service server, and an identifier of the AF network element.

For example, the IP 5-tuple includes an IP address of the terminal, a port of the terminal, an IP address of a service server corresponding to a service of the terminal, a port number of the service server, and a transport layer protocol of the service.

It should be noted that, in this embodiment of this application, when the UPF network element reports the data of the terminal on the UPF network element to the data analytics network element, the carried IP 5-tuple is an internal IP 5-tuple, or when the AF network element reports the data of the terminal on the AF network element to the data analytics network element, the carried IP 5-tuple is an external IP 5-tuple. Therefore, in step 109, to associate the two parts of data, IP address translation needs to be performed through a network address translation (NAT) function entity. There are specifically three ideas as follows.

(1) When the UPF network element reports the data of the terminal on the UPF network element to the data analytics network element, the internal IP 5-tuple is carried, and the data analytics network element queries, from the NAT network element based on the internal IP 5-tuple, an external IP 5-tuple corresponding to the internal IP 5-tuple. After the data analytics network element obtains the external IP 5-tuple corresponding to the internal IP 5-tuple, if the external IP 5-tuple corresponding to the internal IP 5-tuple is the same as the external IP 5-tuple sent by the AF network element, the data analytics network element associates the data of the terminal on the UPF network element with the data of the terminal on the AF network element based on the external IP 5-tuple.

For example, an alternative implementation is as follows. The data analytics network element may query, from the NAT network element based on the external IP 5-tuple carried in the data of the terminal on the AF network element, an internal IP 5-tuple corresponding to the external IP 5-tuple. If the internal IP 5-tuple corresponding to the external IP 5-tuple is consistent with the internal IP 5-tuple carried in the data of the terminal on the UPF network element, the data analytics network element associates the data of the terminal on the UPF network element with the data of the terminal on the AF network element based on the internal IP 5-tuple.

(2) The UPF network element queries, from the NAT network element based on the internal IP 5-tuple, an external IP 5-tuple corresponding to the internal IP 5-tuple, and when reporting the data of the terminal on the UPF network element, the UPF network element reports the external IP 5-tuple corresponding to the internal IP 5-tuple to the data analytics network element. In this way, the data of the terminal on the UPF network element that is received by the data analytics network element also carries the external IP 5-tuple. Therefore, the data of the terminal on the UPF network element is associated with the data of the terminal on the AF network element based on the external IP 5-tuple.

For example, an alternative implementation is as follows. The AF network element queries, from the NAT network element based on the external IP 5-tuple, an internal IP 5-tuple corresponding to the external IP 5-tuple, and when reporting the data of the terminal on the AF network element, the AF network element carries the internal IP 5-tuple corresponding to the external IP 5-tuple. In this way, the data of the terminal on the AF network element that is received by the data analytics network element carries the internal IP 5-tuple. Therefore, the data of the terminal on the UPF network element is associated with the data of the terminal on the AF network element based on the internal IP 5-tuple.

(3) The data of the terminal on the UPF network element carries the internal IP 5-tuple, and the data of the terminal on the AF network element carries the external IP 5-tuple. The data analytics network element associates the data of the terminal on the UPF network element with the data of the terminal on the AF network element based on a correspondence between the internal IP 5-tuple and the external IP 5-tuple.

It should be understood that the data analytics network element has the correspondence between the internal IP 5-tuple and the external IP 5-tuple. The correspondence may be prestored in the data analytics network element, or may be obtained by the data analytics network element from the NAT network element. Specifically, that the data analytics network element obtains the correspondence from the NAT network element includes the following. The NAT network element actively reports the correspondence to the data analytics network element, or the NAT network element sends the correspondence to the data analytics network element based on a request of the data analytics network element.

With reference to FIG. 3A and FIG. 3B, FIG. 4A to FIG. 4C show another embodiment of this application. Before step 101, the method provided in this embodiment of this application further includes the following steps.

Step 110. The data analytics network element sends a request to a network management network element or the AMF network element. The request is usable for requesting the data of the terminal on the first network element, and the request includes any one or more of the following information corresponding to the terminal the area information, time information, and a terminal type.

For example, the terminal type in this embodiment of this application is used by the first network element to determine to collect data of a terminal of a specified terminal type on the first network element. The terminal type may vary with an operating system of the terminal. For example, the terminal type may be a terminal using an Apple system, a terminal using an Android system, or a terminal using a Windows system.

It should be understood that the request sent by the data analytics network element is usable for indicating a collection range in which the first network element collects the data of the terminal on the first network element. The area information may be a tracking area (TA, which is identified by a TAI), a TA list (which is identified by a TAI list), a routing area (RA, which is identified by an RAI), an RA list (which is identified by an RAI list), a cell (which is identified by a CGI or a cell ID), or a cell list (which is identified by a CGI list or a cell ID list). The TA list includes at least one TA. The RA list includes at least one RA.

For example, the time information may be a time window or a time period list. The time information is used by the first network element to determine a start moment and an end moment for collecting the data of the terminal on the first network element, for example, from Mar. 1, 2019 to Mar. 8, 2019. The time information may be a start moment and duration, or a start moment and an end moment. The time information may indicate one time period, or may indicate a plurality of nonconsecutive time periods.

It should be understood that all of the area information, the time information, and the terminal type that are included in the request may exist such that the first network element determines the collection range in which the data of the terminal on the first network element is collected. Alternatively, only one of the area information, the time information, and the terminal type may exist. This is not limited in this embodiment of this application. For example, if the request includes the area information, the time information, and the terminal type, for example, the area information is a TA 1, the time information is from Mar. 1, 2019 to Mar. 8, 2019, and the terminal type is the terminal using the Android system, the first network element may determine to collect data of the terminal using the Android system on the first network element in the TA 1 from Mar. 1, 2019 to Mar. 8, 2019.

Step 111. The first network element receives the request through the network management network element or the AMF network element.

Optionally, the first network element receives, from the network management network element or the mobility management network element, a request message different from that in step 110, but the request message includes same information as that in step 110.

Step 112. The first network element obtains the data of the terminal on the first network element.

For example, step 112 may be specifically implemented in the following manner.

Step 1121. The network management network element assigns a trace reference and MDT parameters of the access network element and the terminal to an area, and configures the trace reference and the MDT parameters on the access network element. Some MDT parameters are listed as follows. Area scope (list of E-UTRAN cells) is the terminal collects data only when the terminal is in a corresponding area. Trace reference is the trace reference is globally unique and identifies a trace procedure. List of measurements M1, M2, M3, and M4, and the like. Reporting trigger event. Report interval (Report Interval). The measurements M1, M2, M3, and M4 correspond to different MDT data. For details, refer to Table 1.

M1 measurement data is RSRP (at a terminal level and measured by the terminal) and RSRQ (at a terminal level and measured by the terminal)

M2 measurement data is power headroom (at a terminal level and measured by the terminal)

M3 measurement data is received interference power (at a terminal level and measured by the terminal)

M4 measurement data is data volume (at a bearer level and measured by the access network element)

M5 measurement data is scheduled IP throughput for uplink/downlink (at a bearer level and measured by the access network element)

M6 measurement data is packet delay for uplink/downlink (at a bearer level and measured by the UE and the access network element)

M7 measurement data is packet loss rate for uplink/downlink (at a bearer level and measured by the access network element)

M8 measurement data is RSSI (at a terminal level and measured by the terminal)

M9 measurement data is RTT (at a terminal level and measured by the terminal).

Step 1122. The access network element selects a terminal based on first information, and collection of MDT data by the terminal is triggered provided that the terminal camps om an area indicated by the network management network element. For example, the first information includes an MDT data collection area requirement (a TA or a TA list) of the network management network element and a cell (Cell ID) in which the terminal is located, and (optional) the AMF network element or the MME indicates, using an initial context setup request or a handover request, whether the terminal is allowed to activate the MDT.

Step 1123. If the terminal is selected, the access network element assigns and sends a trace recording session reference (TRSR), which uniquely identifies the terminal on the eNB, to the terminal. The terminal is requested to include the identifier in the MDT data when reporting the MDT data.

Importantly, to avoid repetition of TRSRs on different access network elements, a cell ID, that is, a CGI of a serving cell serving the terminal needs to be reported for the MDT data.

Step 1124. The access network element obtains the MDT data from the terminal, and reports the MDT data together with MDT data of the terminal on the access network element and the CGI of the serving cell serving the terminal to a trace collection entity (TCE).

Specifically, the first network element obtains the data of the terminal on the first network element based on a first request.

Step 113. The first network element sends the data of the terminal on the first network element to the data analytics network element through the network management network element or the AMF network element.

For the data of the terminal on the first network element in step 112 and step 113, refer to the description in the foregoing embodiment. Details are not described herein again.

In an alternative implementation, step 110 to step 113 may be replaced with the following manner. The data analytics network element sends a request to the first network element, where the request is usable for requesting the data of the terminal on the first network element. The first network element receives the request from the data analytics network element, where the request includes any one or more of the following information corresponding to the terminal the area information, time information, and a terminal type. The first network element obtains the data of the terminal on the first network element. The first network element sends the data of the terminal on the first network element to the data analytics network element.

It should be noted that, in this embodiment of this application, when the data analytics network element obtains data of the terminal on any network element, the network element may use the data of the terminal on the network element to carry the first identifier, the second identifier, the third identifier, or the fourth identifier when reporting the data. Certainly, when reporting the data of the terminal on the network element, the network element may further report a same message including the data of the terminal on the network element and the first identifier, or the second identifier, or the third identifier, or the fourth identifier to the data analytics network element.

In a possible implementation, the first identifier, the second identifier, the third identifier, and the fourth identifier each may further include time information or a trace recording session reference. The time information is usable for indicating a valid time period, time interval, slot, time window, timestamp, or time point of each of the first identifier, the second identifier, the third identifier, and the fourth identifier. The trace recording session reference is usable for indicating a trace record of the terminal.

It should be understood that in step 113, the first network element may send the data of the terminal on the first network element to the data analytics network element through the network management network element or the AMF network element.

Correspondingly, step 101 may be implemented in the following manner. The data analytics network element receives the data of the terminal on the first network element from the network management network element or the AMF network element.

It may be understood that, if the first network element actively sends the data of the terminal on the first network element to the data analytics network element, step 110 and step 111 may be omitted. It may be understood that, if the first network element actively sends the data of the terminal on the first network element to the data analytics network element, any one or more of the area information, the time information, and the terminal type may be determined by the first network element.

Figure 4A:
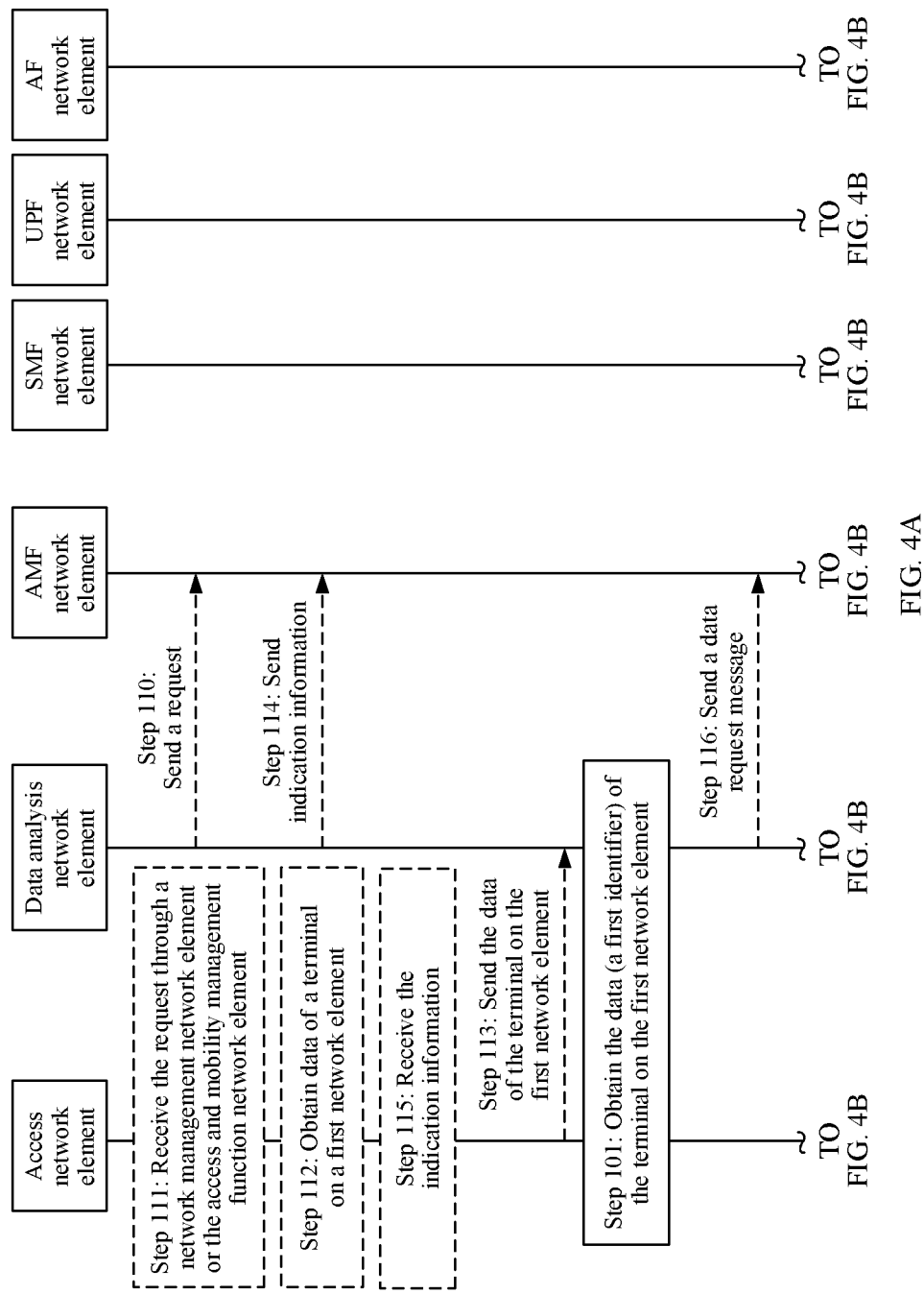
FIG. 4A to FIG. 4C are a schematic flowchart of another data processing method according to an embodiment of this application.
Figure 4B:
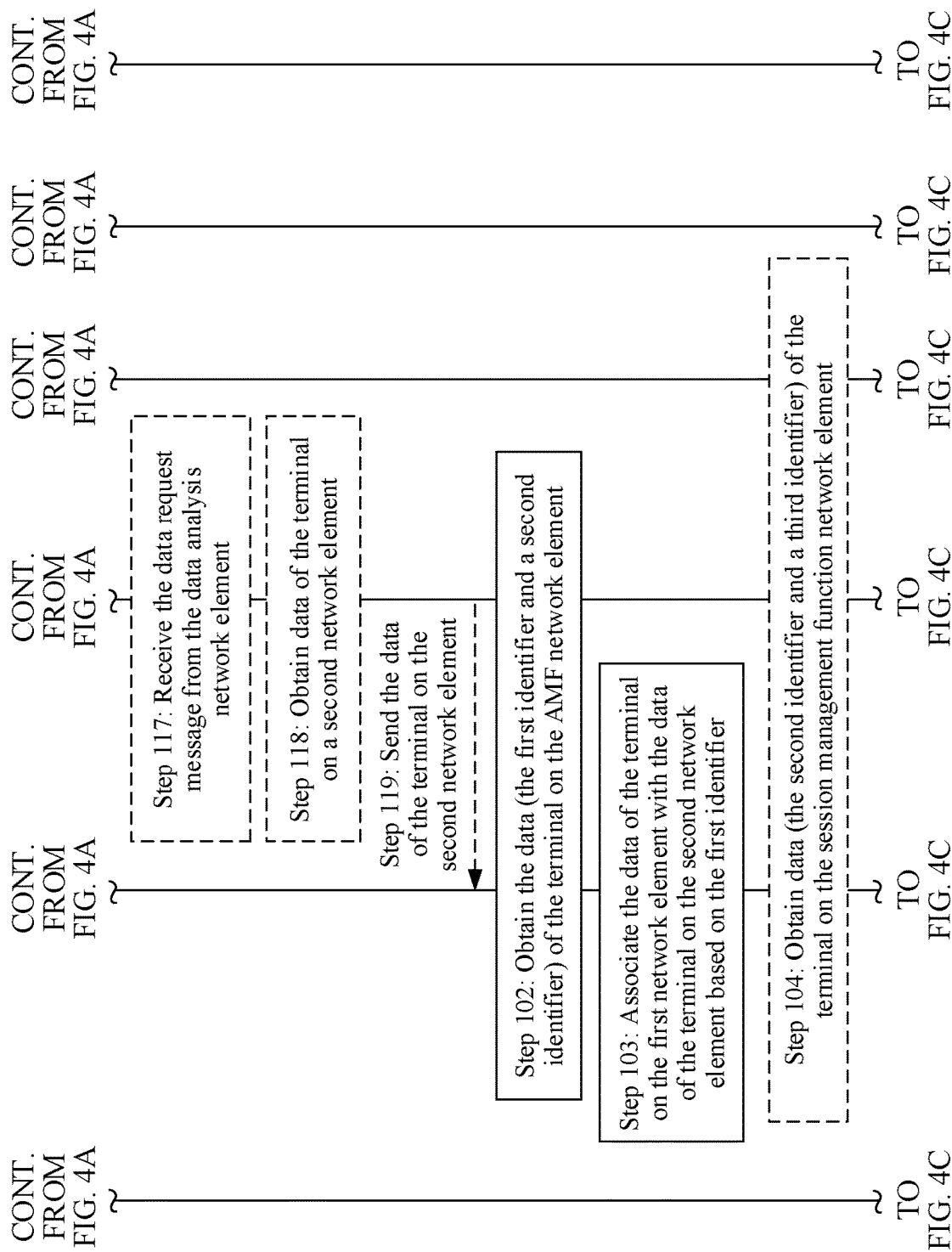
Figure 4C:
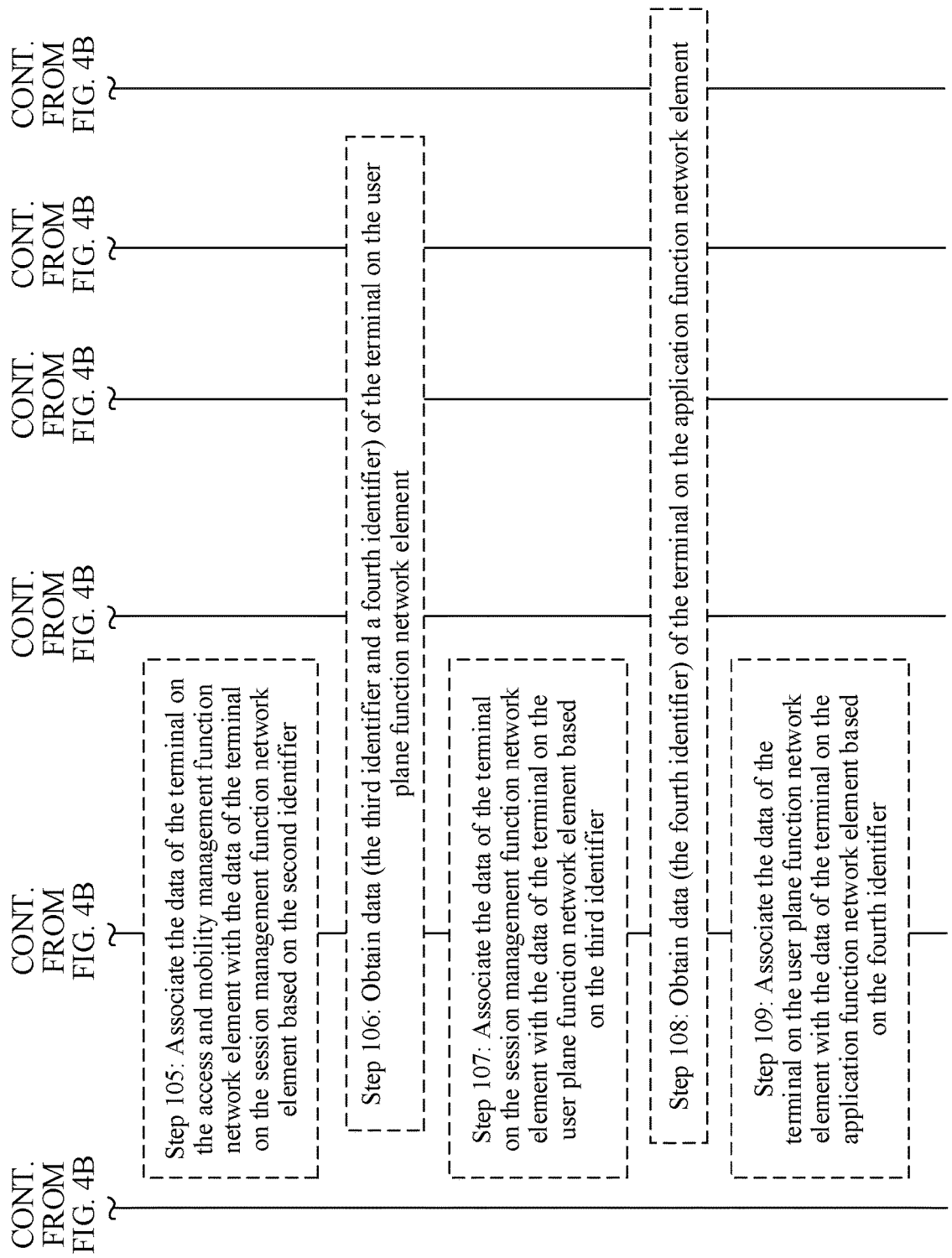

In an optional embodiment, as shown in FIG. 4A to FIG. 4C, before step 113, the method provided in this embodiment of this application further includes the following steps.

Step 114. The data analytics network element sends indication information to the network management network element or the AMF network element. The indication information is usable for indicating the first network element to report the first identifier.

Step 115. The first network element receives the indication information from the data analytics network element through the network management network element or the AMF network element.

In an optional embodiment, with reference to FIG. 4A to FIG. 4C, before step 102, the method provided in this embodiment of this application further includes the following steps.

Step 116. The data analytics network element sends a data request message to the second network element. The data request message includes any one or more of the following information corresponding to the terminal the area information, the time information, a group identifier, and the terminal type.

The group identifier is used to determine a group. The group includes one or more terminals.

For definitions of the area information, the time information, and the terminal type, refer to the foregoing descriptions. Details are not described herein again. However, it may be understood that the area information, the time information, and the terminal type that are sent by the data analytics network element to the second network element may be the same as or different from the area information, the time information, and the terminal type that are sent to the first network element.

Step 117. The second network element receives the data request message from the data analytics network element.

Step 118. The second network element obtains the data of the terminal on the second network element.

Correspondingly, the second network element obtains the data of the terminal on the second network element based on the data request message.

Step 119. The second network element sends the data of the terminal on the second network element to the data analytics network element.

For example, if the second network element is the AMF network element, the data request message may be Namf_EventExposure_Subscribe, or the data request message may be carried in Namf_EventExposure_Subscribe. The AMF network element may send the data of the terminal on the AMF network element to the data analytics network element using Namf_EventExposure_Notify.

If the second network element is the SMF network element, the data request message may be Nsmf_EventExposure_Subscribe, or the data request message may be carried in Nsmf_EventExposure_Subscribe. The SMF network element may send the data of the terminal on the SMF network element to the data analytics network element using Nsmf_EventExposure_Notify.

If the second network element is the UPF network element, the data analytics network element first sends Namf_EventExposure_Subscribe to the SMF network element. The Namf_EventExposure_Subscribe carries the data request message. Then, the SMF network element sends the data request message to the UPF network element using an N4 session modification message. The UPF network element may directly send the data of the terminal on the UPF network element to the data analytics network element using Nupf_EventExposure_Subscribe.

If the second network element is the AF network element, the data request message is Naf_EventExposure_Subscribe, or the data request message is carried in Naf_EventExposure_Subscribe. In this case, the AF network element may send the data of the terminal on the AF network element to the data analytics network element using Naf_EventExposure_Notify.

It may be understood that, if the second network element actively sends the data of the terminal on the second network element to the data analytics network element, step 116 and step 117 may be omitted. It may be understood that, if the second network element actively sends the data of the terminal on the second network element to the data analytics network element, any one or more of the area information, the time information, the group identifier, and the terminal type may be determined by the second network element.

Correspondingly, step 102 may be implemented in the following manner. The data analytics network element receives the data of the terminal on the second network element from the second network element.

Based on the foregoing description, the second network element may be any one of the AMF network element, the SMF network element, the UPF network element, the PCF network element, the AF network element, or the terminal. Therefore, a process in which the data analytics network element obtains the data of the terminal on the SMF network element, the UPF network element, or the AF network element in the foregoing embodiment may be implemented using step 116 to step 119.

It should be noted that, in this embodiment of this application, the SMF network element may send the data of the terminal on the SMF network element to the data analytics network element in the following manner.

Manner 1. The SMF network element may directly send the data of the terminal on the SMF network element to the data analytics network element.

Manner 2. The SMF network element may send the data of the terminal on the SMF network element to the UPF network element, and the UPF network element sends the data of the terminal on the SMF network element to the data analytics network element.

An advantage of the manner 2 is that complexity of data association by the data analytics network element can be reduced and accuracy of data association by the data analytics network element can be increased.

The foregoing embodiment uses an example in which the second network element is the AMF network element to describe, using step 101 to step 109, a process in which the data analytics network element sequentially associates every two of the data of the terminal on the access network element, the data of the terminal on the AMF network element, the data of the terminal on the SMF network element, the data of the terminal on the UPF network element, and the data of the terminal on the AF network element, to finally obtain complete service MOS model training data.

The following embodiment uses an example in which the second network element is the UPF network element to describe, with reference to FIG. 4A to FIG. 4C, how the data analytics network element implements the following two association processes in detail.

Association process 1. The data analytics network element sequentially associates every two of the data of the terminal on the access network element, the data of the terminal on the UPF network element, and the data of the terminal on the AF network element, to finally obtain complete data of the terminal on the access network element, the UPF network element, and the AF network element. Optionally, the associated data may be used for service MOS model training.

Association process 2. The data analytics network element sequentially associates every two of the data of the terminal on the access network element, the data of the terminal on the UPF network element, the data of the terminal on the SMF network element, and the data of the terminal on the AMF network element, to finally obtain complete data of the terminal on the access network element, the UPF network element, the SMF network element, and the AMF network element. Optionally, the associated data may be used for service MOS model training.

As shown in FIG. 5A and FIG. 5B, an embodiment of this application provides another data processing method. The method includes the following steps.

Descriptions of step 201 to step 203 are similar to those of step 101 to step 103 in the foregoing embodiment, and details are not described herein again.

For example, the first identifier further includes at least one of the following information an identifier of the first network element, an identifier of the second network element, an identifier of the terminal, network instance information, and area information of the terminal. However, a difference from step 101 to step 103 lies in that the identifier assigned by the first network element to the terminal in step 201 to step 203 is an identifier assigned by an access network element to the terminal on a third interface, where the third interface is an interface between the access network element and a UPF network element, and the identifier assigned by the second network element to the terminal is an identifier assigned by the UPF network element to the terminal on the third interface.

For example, the third interface may be the N3 interface shown in FIG. 2. Optionally, the third interface may alternatively be an N9 interface. The N9 interface exists only when there is a plurality of UPF network elements in a session of the terminal, and an interface between every two of these different UPF network elements is an N9 interface.

For example, the second network element is the UPF network element. In this way, the data of the terminal on the access network element can be associated with the data of the terminal on the UPF network element.

In a possible example, after the data analytics network element associates the data of the terminal on the access network element with the data of the terminal on the UPF network element, to associate the data of the terminal on the UPF network element with data of the terminal on an AF network element, in this embodiment of this application, the data of the terminal on the UPF network element further includes a fourth identifier. The fourth identifier is usable for associating the data of the terminal on the UPF network element with the data of the terminal on the AF network element.

Correspondingly, still with reference to FIG. 5A and FIG. 5B, in a possible embodiment of this application, the method provided in this embodiment of this application further includes the following steps.

Step 204. The data analytics network element obtains the data of the terminal on the AF network element. The data of the terminal on the AF network element includes the fourth identifier.

Step 205. The data analytics network element associates the data of the terminal on the UPF network element with the data of the terminal on the AF network element based on the fourth identifier.

In a possible implementation, the fourth identifier may further include at least one of the following information an IP 5-tuple, the identifier of the terminal, an identifier of the UPF network element, a service identifier of a service, an identifier of a service server, and an identifier of the AF network element.

It should be understood that the data analytics network element may implement the association process 1 by performing step 201 to step 205.

In another possible example, after the data analytics network element associates the data of the terminal on the access network element with the data of the terminal on the UPF network element, to associate the data of the terminal on the UPF network element with data of the terminal on a SMF network element, the data of the terminal on the UPF network element further includes a third identifier. The third identifier includes an identifier assigned by the SMF network element to a session of the terminal.

Correspondingly, as shown in FIG. 5A and FIG. 5B, the method provided in this embodiment of this application further includes the following steps.

Step 206. The data analytics network element obtains the data of the terminal on the SMF network element. The data of the terminal on the SMF network element includes the third identifier.

Step 207. The data analytics network element associates the data of the terminal on the SMF network element with the data of the terminal on the UPF network element based on the third identifier.

In a possible implementation, the third identifier includes at least one of the following information an identifier of the SMF network element, the identifier of the UPF network element, the identifier of the terminal, a session identifier of the terminal, and a flow identifier of the terminal.

In a possible example, to further associate the data of the terminal on the SMF network element with data of the terminal on an AMF network element, the data of the terminal on the SMF network element further includes a second identifier. The second identifier includes a session management context identifier of the terminal.

Correspondingly, still with reference to FIG. 5A and FIG. 5B, the method provided in this embodiment of this application further includes the following steps.

Step 208. The data analytics network element obtains the data of the terminal on the AMF network element. The data of the terminal on the AMF network element includes the second identifier.

Step 209. The data analytics network element associates the data of the terminal on the AMF network element with the data of the terminal on the SMF network element based on the second identifier.

In a possible implementation, the second identifier includes at least one of the following information an identifier of the AMF network element, the identifier of the SMF network element, a CGI, the identifier of the terminal, and the session identifier of the terminal.

It should be noted that, for a related description of data of the terminal on each network element and related explanations of the first identifier, the second identifier, the third identifier, and the fourth identifier in step 201 to step 209, refer to related descriptions in step 101 to step 119. Details are not described herein again.

It should be understood that the data analytics network element may implement the association process 2 by performing steps 201 to 203 and steps 206 to 209.

It should be noted that, in the embodiment in which an example in which the second network element is the UPF network element is used, for a process in which the data analytics network element requests the data of the terminal on the first network element from the first network element, refer to related descriptions in step 110 to step 115. Details are not described herein again. For a process in which the data analytics network element requests the data of the terminal on the UPF network element, the SMF network element, the AF network element, or the AMF network element from the second network element, refer to related descriptions in step 116 to step 119. Details are not described herein again.

For example, the foregoing descriptions are shown in Table 2. Table 2 shows data association identifiers.

TABLE 2

| | | Data association identifier | |
|---|---|---|---|
| Data source | Data (as an example) | ID | Remarks |
| Network elements | Timestamp | Timestamp | Time, recorded by each network element, of data of the terminal on each network element |
| UE/RAN | MDT data | Trace recording session reference | Identify MDT data of the terminal |
| | | AMF UE NGAP ID | Uniquely identify an AMF tunnel identifier of the terminal on the N2 interface |
| | | RAN UE NGAP ID | Uniquely identify a RAN tunnel identifier of the terminal on the N2 interface |
| | | CGI or global RAN Node ID | Cell identifier or base station identifier for preventing the AMF UE NGAP ID or the RAN UE NGAP ID from being duplicated on different AMF network elements or RANs. |
| AMF network element | Location information of the terminal | AMF UE NGAP ID | Uniquely identify an AMF tunnel identifier of the terminal on the N2 interface |
| | | RAN UE NGAP ID | Uniquely identify a RAN tunnel identifier of the terminal on the N2 interface |
| | | CGI or global RAN Node ID | Cell identifier or base station identifier for preventing the AMF UE NGAP ID or the RAN UE NGAP ID from being duplicate on different AMF network elements or RANs |

TABLE 2-continued

Data association identifier

| Data source | Data (as an example) | ID | Remarks |
|---|---|---|---|
| | | SMF ID | An SM Context ID is unique only in the SMF network element. Therefore, the SMF ID needs to be carried to uniquely identify a PDU session of the UE on the entire network. |
| | | AMF ID | The AMF ID is necessary for data association. When the data analytics network element directly subscribes to the data of the terminal on the AMF network element from the AMF network element, the data analytics network element naturally learns of the AMF ID. Therefore, the AMF ID may not be carried when the AMF network element reports the data. |
| | | UE ID | Identifier of the terminal |
| | | PDU session ID | Identify a PDU session of the terminal |
| | | SM Context ID | = SUPI + PDU session ID. The SM Context ID is assigned by the SMF network element between the AMF network element and the SMF network element. The SM Context ID uniquely identifies a PDU session in a single SMF network element. |
| SMF network element | Session data | UPF ID | Identify a UPF address corresponding to a session |
| | | ID of the SMF network element | The ID of the SMF network element is necessary for data association. When an NWDAF network element directly subscribes to the data of the terminal on the SMF network element from the SMF network element, the NWDAF network element naturally learns of the ID of the SMF network element. Therefore, the ID of the SMF network element may not be carried. |
| | | UE ID | Identifier of the terminal |
| | | SM Context ID | = SUPI + PDU session ID. The SM Context ID is assigned by the SMF network element between the AMF network element and the SMF network element. The SM Context ID uniquely identifies a PDU session in a single SMF network element. |
| | | PDU session ID | Uniquely identify a session of a UE on the SMF network element |
| | | N4 session ID | The N4 session ID is assigned by the SMF network element, and is used to identify an N4 session of the terminal |
| | | QoS flow ID (QFI) | Identify a QoS flow (It should be noted that a QoS flow may include a plurality of service flows, and each service flow is identified by an IP 5-tuple) |
| UPF network element | Service QoS flow data | SMF ID | Identify an address of the SMF network element corresponding to a session |
| | | UPF ID | The UPF ID is necessary for data association. 1. When the data analytics network element directly subscribes to the data of the terminal on the UPF network element from the UPF network element, the data analytics network element naturally learns of the UPF ID. Therefore, the UPF ID may not be carried when the UPF |

TABLE 2-continued

Data association identifier

| Data source | Data (as an example) | ID | Remarks |
|---|---|---|---|
| | | | network element reports the data. 2. If the data analytics network element subscribes to the data of the terminal on the UPF network element through the SMF network element, the UPF ID needs to be carried when the UPF network element reports the data. |
| | | N4 session ID | The N4 session ID is assigned by the SMF network element, and is used to identify an N4 session of the terminal. |
| | | Application ID or IP 3-tuple | Identify a service or a service server |
| | | QFI | Identify a QoS flow |
| | | IP 5-tuple | Identify a service flow of the terminal |
| AF network element | Service data | Application ID or IP 3-tuple | Identify a service or a service server |
| | | IP 5-tuple | Identify a service flow of the terminal |
| | | UE ID | Identifier of the terminal |

In a possible embodiment, the data analytics network element may further request network management data (including performance management data, fault management data, and the like of the second network element) of the second network element serving the terminal on a network management network element from the network management network element. The request message includes area information and/or the identifier of the second network element. Specifically, the identifier of the second network element may be determined by the data analytics network element from an NRF.

It should be noted that the network management data of the second network element on the network management network element includes a fifth identifier. The data analytics network element associates the data of the terminal on the second network element with the network management data of the second network element on the network management network element based on the fifth identifier. The fifth identifier is at least one of the following information the identifier of the second network element, the identifier of the terminal, and the area information.

It should be noted that the foregoing embodiment is described using an example in which the first network element is the access network element. In another possible embodiment, the first network element may alternatively be a first UPF network element, and the second network element may alternatively be a second UPF network element. In this case, the data analytics network element may obtain data of the terminal on the first UPF network element and data of the terminal on the second UPF network element. The data of the terminal on the first UPF network element and the data of the terminal on the second UPF network element each include a sixth identifier. The sixth identifier is any one or more of the following information the identifier of the terminal, the session identifier of the terminal, the flow identifier of the terminal, an identifier assigned by the first UPF network element to a session of the terminal on a third interface, and an identifier assigned by the second UPF network element to the session of the terminal on the third interface. The third interface is an interface between the first UPF network element and the second UPF network element. For example, the interface between the first UPF network element and the second UPF network element may be an N9 interface.

The first UPF network element and the second UPF network element may be two UPF network elements located at a visited location and a home location in a roaming scenario (for example, Home Routed), or may be an intermediate UPF network element (I-UPF) and an anchor UPF network element that are inserted in a non-roaming scenario.

In another embodiment, the first network element may alternatively be a first SMF network element, and the second network element may alternatively be a second SMF network element. The data analytics network element may obtain data of the terminal on the first SMF network element and data of the terminal on the second SMF network element. The data of the terminal on the first SMF network element and the data of the terminal on the second SMF network element each include a seventh identifier. The seventh identifier includes any one or more of the following information the identifier of the terminal, the session identifier of the terminal, the flow identifier of the terminal, an identifier of the first SMF network element, an identifier of the second SMF network element, an identifier assigned by the first SMF network element to a session of the terminal on a fourth interface, and an identifier assigned by the second SMF network element to the session of the terminal on the fourth interface. The fourth interface is an interface between the first SMF network element and the second SMF network element. For example, the interface between the first SMF network element and the second SMF network element may be an N16 interface.

The first SMF network element and the second SMF network element may be two SMF network elements located at a visited location and a home location in a roaming scenario (for example, Home Routed), or may be an intermediate SMF network element (I-SPF) and an anchor SMF network element that are inserted in a non-roaming scenario.

The foregoing describes the solutions in the embodiments of this application mainly from a perspective of interaction between network elements. It may be understood that, to implement the foregoing functions, the network elements such as the data analytics network element, the access network element, the UPF network element, the AF network element, the SMF network element, and the AMF network element include corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, division into function units may be performed on the data analytics network element, the access network element, the UPF network element, the AF network element, the SMF network element, and the AMF network element in the foregoing method examples. For example, each function unit may be obtained through division based on each corresponding function, or two or more functions may be integrated into one processing unit. The integrated unit may be implemented in the form of hardware, or may be implemented in the form of a software function unit. It should be noted that, in the embodiments of this application, division into the units is used as an example, and is merely logical function division. In an embodiment, another division manner may be used.

The foregoing describes the method in the embodiments of this application with reference to FIG. 3A and FIG. 3B to FIG. 5A and FIG. 5B. The following describes a data processing apparatus for performing the foregoing method according to an embodiment of this application. A person skilled in the art may understand that the method and the apparatus may be combined and referenced with each other. The data processing apparatus provided in the embodiments of this application may perform a step performed by the data analytics network element, the first network element, the SMF network element, the AMF network element, the UPF network element, or the AF network element in the foregoing data processing methods.

Descriptions are provided below using an example in which function modules are obtained through division based on corresponding functions.

Figure 6:
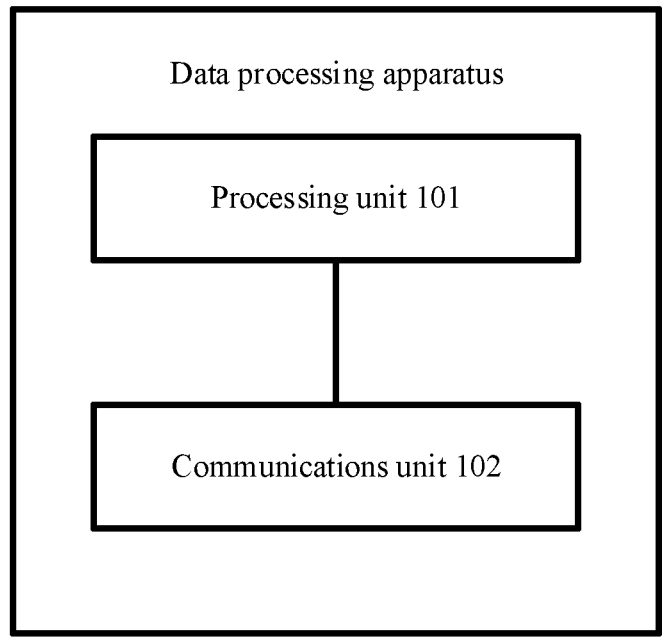
FIG. 6 is a schematic structural diagram of a data processing apparatus according to an embodiment of this application.

When an integrated unit is used, FIG. 6 shows a data processing apparatus in the foregoing embodiments. The data processing apparatus may include a processing unit 101 and a communications unit 102.

In an example, the data processing apparatus is a data analytics network element, or is a chip applied to the data analytics network element. In this case, the communications unit 102 is configured to support the data processing apparatus in performing step 101 and step 102 that are performed by the data analytics network element in the foregoing embodiments. The processing unit 101 is configured to support the data processing apparatus in performing step 103 performed by the data analytics network element in the foregoing embodiments.

In a possible embodiment, the communications unit 102 is further configured to support the data processing apparatus in performing step 104, step 106, step 108, step 110, step 114, and step 116 that are performed by the data analytics network element in the foregoing embodiments. The processing unit 101 is further configured to support the data processing apparatus in performing step 105, step 107, and step 109 that are performed by the data analytics network element in the foregoing embodiments.

In another example, the data processing apparatus is a data analytics network element, or is a chip applied to the data analytics network element. In this case, the communications unit 102 is configured to support the data processing apparatus in performing step 201 and step 202 that are performed by the data analytics network element in the foregoing embodiments. The processing unit 101 is configured to support the data processing apparatus in performing step 203 performed by the data analytics network element in the foregoing embodiments.

In a possible embodiment, the communications unit 102 is further configured to support the data processing apparatus in performing step 204, step 206, and step 208 that are performed by the data analytics network element in the foregoing embodiments. The processing unit 101 is further configured to support the data processing apparatus in performing step 205, step 207, and step 209 that are performed by the data analytics network element in the foregoing embodiments.

In still another example, the data processing apparatus is an access network element, or a chip applied to the access network element. In this case, the processing unit 101 is configured to support the data processing apparatus in performing step 112 performed by the first network element in the foregoing embodiments. The communications unit 102 is configured to support the data processing apparatus in performing step 113 performed by the first network element in the foregoing embodiments.

The communications unit 102 is further configured to support the data processing apparatus in performing step 111 performed by the first network element in the foregoing embodiments.

In yet another example, the data processing apparatus is a second network element, or a chip applied to the second network element. In this case, the processing unit 101 is configured to support the data processing apparatus in performing step 118 performed by the second network element in the foregoing embodiments. The communications unit 102 is configured to support the data processing apparatus in performing step 119 performed by the second network element in the foregoing embodiments.

The communications unit 102 is further configured to support the data processing apparatus in performing step 117 performed by the second network element in the foregoing embodiments.

Figure 7:
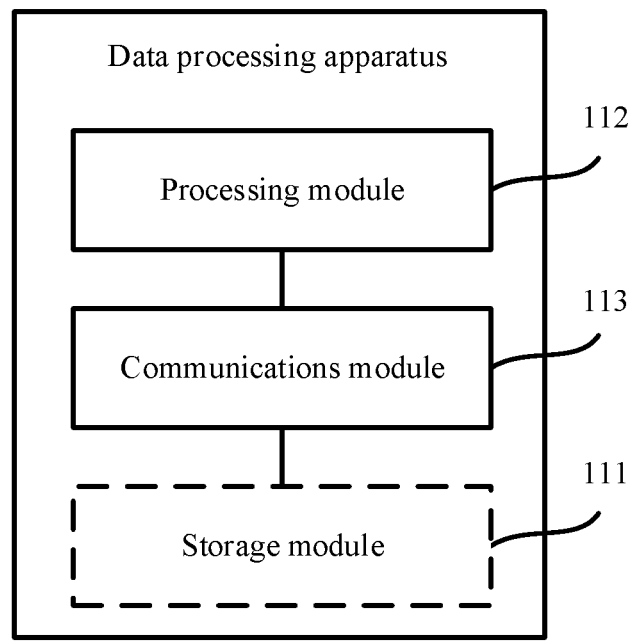
FIG. 7 is a schematic structural diagram of another data processing apparatus according to an embodiment of this application.

When an integrated unit is used, FIG. 7 is a possible schematic diagram of a logical structure of the data processing apparatus in the foregoing embodiments. The data processing apparatus includes a processing module 112 and a communications module 113. The processing module 112 is configured to control and manage actions of the data processing apparatus. For example, the processing module 112 is configured to perform an information/data processing step of the data processing apparatus. The communications module 113 is configured to support the data processing apparatus in performing an information/data sending or receiving step.

In a possible embodiment, the data processing apparatus may further include a storage module 111 configured to store program code and data that may be used by the data processing apparatus.

For example, the data processing apparatus is a data analytics network element, or is a chip applied to the data analytics network element. In this case, the communications module 113 is configured to support the data processing apparatus in performing step 101 and step 102 that are performed by the data analytics network element in the foregoing embodiments. The processing module 112 is configured to support the data processing apparatus in performing step 103 in the foregoing embodiments.

In a possible embodiment, the communications module 113 is further configured to support the data processing apparatus in performing step 104, step 106, step 108, step 110, step 114, and step 116 that are performed by the data analytics network element in the foregoing embodiments. The processing module 112 is further configured to support the data processing apparatus in performing step 105, step 107, and step 109 that are performed by the data analytics network element in the foregoing embodiments.

For example, the data processing apparatus is a data analytics network element, or is a chip applied to the data analytics network element. In this case, the communications module 113 is configured to support the data processing apparatus in performing step 201 and step 202 that are performed by the data analytics network element in the foregoing embodiments. The processing module 112 is configured to support the data processing apparatus in performing step 203 performed by the data analytics network element in the foregoing embodiments.

In a possible embodiment, the communications module 113 is further configured to support the data processing apparatus in performing step 204, step 206, and step 208 that are performed by the data analytics network element in the foregoing embodiments. The processing module 112 is further configured to support the data processing apparatus in performing step 205, step 207, and step 209 that are performed by the data analytics network element in the foregoing embodiments.

In another example, the data processing apparatus is an access network element, or a chip applied to the access network element. In this case, the processing module 112 is configured to support the data processing apparatus in performing step 112 performed by the first network element in the foregoing embodiments. The communications module 113 is configured to support the data processing apparatus in performing step 113 performed by the first network element in the foregoing embodiments.

The communications module 113 is further configured to support the data processing apparatus in performing step 111 performed by the first network element in the foregoing embodiments.

In still another example, the data processing apparatus is a second network element (for example, the second network element may be a SMF network element, an AF network element, an AMF network element, or a UPF network element), or a chip applied to the second network element. In this case, the processing module 112 is configured to support the data processing apparatus in performing step 118 performed by the second network element in the foregoing embodiments. The communications module 113 is configured to support the data processing apparatus in performing step 119 performed by the second network element in the foregoing embodiments.

The communications module 113 is further configured to support the data processing apparatus in performing step 117 performed by the second network element in the foregoing embodiments.

The processing module 112 may be a processor or a controller. For example, the processing module 112 may be a CPU, a general purpose processor, a digital signal processor (DSP), an application-specific integrated circuit (ASIC), a field programmable gate array (FPGA) or another programmable logic device, a transistor logic device, a hardware component, or any combination thereof. The processing module 112 may implement or execute various example logical blocks, modules, and circuits described with reference to content disclosed in the present disclosure. Alternatively, the processor may be a combination of processors implementing a computing function, for example, a combination of one or more microprocessors, or a combination of the DSP and a microprocessor. The communications module 113 may be a transceiver, a transceiver circuit, a communications interface, or the like. The storage module 111 may be a memory.

Figure 8:
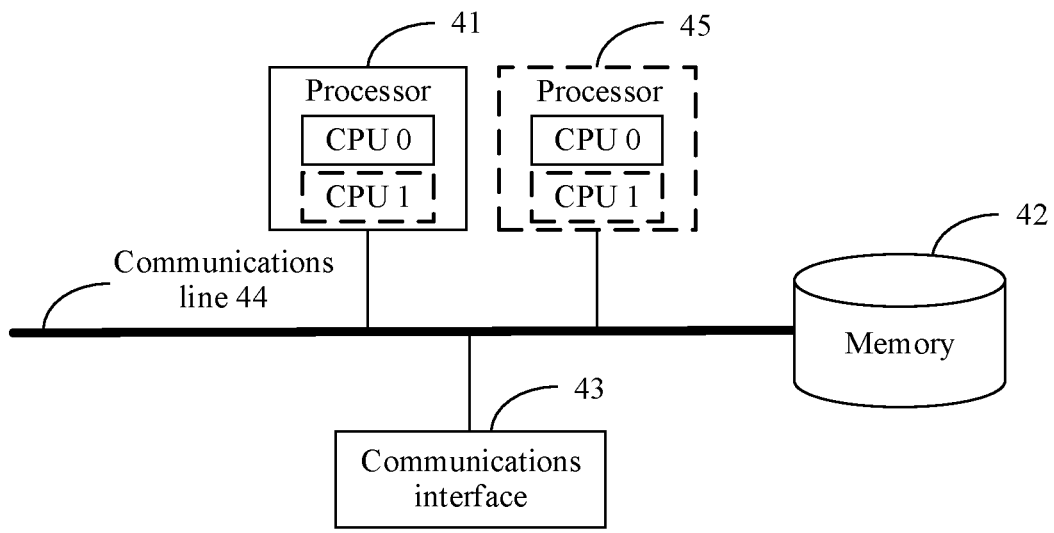
FIG. 8 is a schematic structural diagram of still another data processing apparatus according to an embodiment of this application.

When the processing module 112 is a processor 41 or a processor 45, the communication module 113 is a communications interface 43 or a transceiver, and the storage module 111 is a memory 42, the data processing apparatus in this application may be a communications device shown in FIG. 8. The communications device includes a processor 41, a communications line 44, and at least one communications interface (FIG. 8 is described only using an example in which the communications device includes a communications interface 43).

Optionally, the communications device may further include the memory 42.

The processor 41 may be a general-purpose CPU, a microprocessor, an ASIC, or one or more integrated circuits configured to control program execution of the solutions in this application.

The communications line 44 may include a path on which information is transferred between the foregoing components.

The communications interface 43 is configured to communicate with another device or a communications network such as the Ethernet, a RAN, or a WLAN using any apparatus such as a transceiver.

The memory 42 may be a ROM or another type of static storage device that can store static information and an instruction, or a RAM or another type of dynamic storage device that can store information and an instruction, or may be an electrically erasable programmable ROM (EEPROM), a compact disc ROM (CD-ROM) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store expected program code in the form of an instruction or a data structure and that is accessible by a computer, but is not limited thereto. The memory may exist independently, and is connected to the processor through the communications line 44. The memory may alternatively be integrated with the processor.

The memory 42 is configured to store a computer-executable instruction for executing the solutions in this application, and the execution is controlled by the processor 41. The processor 41 is configured to execute the computer-executable instruction stored in the memory 42, to implement the data processing method provided in the foregoing embodiments of this application.

Optionally, the computer-executable instruction in the embodiments of this application may also be referred to as application program code. This is not specifically limited in the embodiments of this application.

During specific implementation, in an embodiment, the processor 41 may include one or more CPUs, for example, a CPU 0 and a CPU 1 in FIG. 8.

During specific implementation, in an embodiment, the communications device may include a plurality of processors such as the processor 41 and a processor 45 in FIG. 8. Each of the processors may be a single-core (single-CPU) processor or a multi-core (multi-CPU) processor. The processor herein may be one or more devices, circuits, and/or processing cores for processing data (for example, a computer program instruction).

It should be understood that, if the data processing apparatus is an access network element, the communications interface 43 may be replaced with a transceiver.

Figure 9:
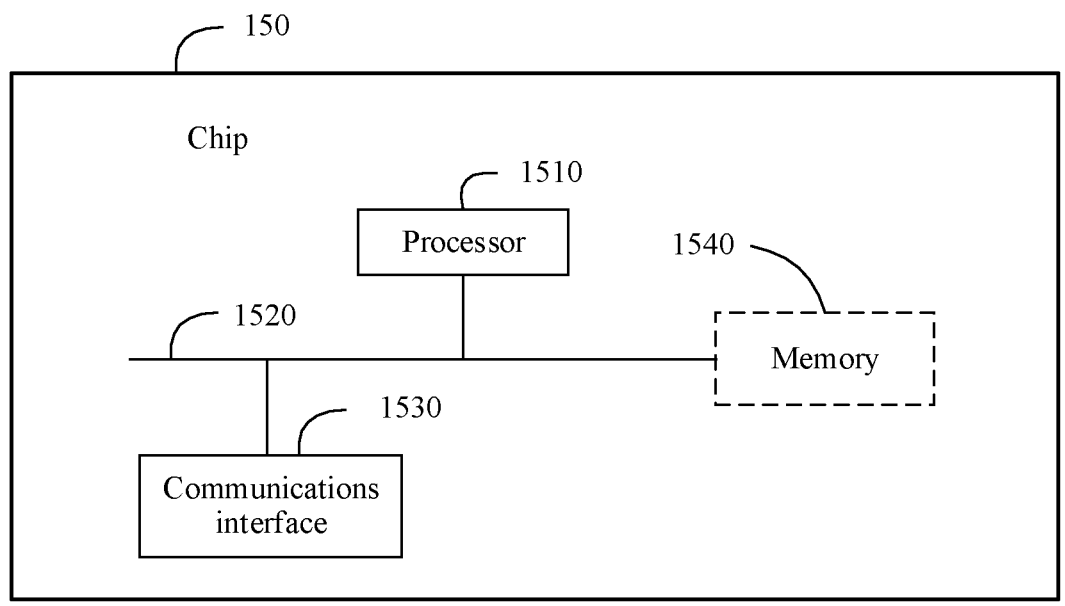
FIG. 9 is a schematic structural diagram of a chip according to an embodiment of this application.

FIG. 9 is a schematic structural diagram of a chip 150 according to an embodiment of this application. The chip 150 includes one or more (including two) processors 1510 and one or more communications interfaces 1530.

Optionally, the chip 150 further includes a memory 1540. The memory 1540 may include a ROM and a RAM, and provide an operation instruction and data for the processor 1510. A part of the memory 1540 may further include a non-volatile RAM (NVRAM).

In some implementations, the memory 1540 stores the following element an executable module or a data structure, a subset thereof, or an extended set thereof.

In this embodiment of this application, a corresponding operation is performed by invoking the operation instruction (the operation instruction may be stored in an operating system) stored in the memory 1540.

In a possible implementation, structures of chips used by the data analytics network element, the access network element, the UPF network element, the AF network element, the SMF network element, and the AMF network element are similar, and different apparatuses may use different chips to implement respective functions.

The processor 1510 controls a processing operation of any one of the data analytics network element, the access network element, the UPF network element, the AF network element, the SMF network element, and the AMF network element. The processor 1510 may also be referred to as a CPU.

The memory 1540 may include a ROM and a RAM, and provide an instruction and data for the processor 1510. A part of the memory 1540 may further include a NVRAM. For example, during application, the memory 1540, the communications interface 1530, and the memory 1540 are coupled to each other through a bus system 1520. In addition to a data bus, the bus system 1520 may further include a power bus, a control bus, a status signal bus, or the like. However, for clear description, various types of buses in FIG. 9 are marked as the bus system 1520.

The methods disclosed in the embodiments of this application may be applied to the processor 1510, or may be implemented by the processor 1510. The processor 1510 may be an integrated circuit chip and has a signal processing capability. In an implementation process, steps in the foregoing methods can be implemented using a hardware integrated logical circuit in the processor 1510, or using instructions in the form of software. The processor 1510 may be a general purpose processor, a DSP, an ASIC, an FPGA or another programmable logic device, a discrete gate or transistor logic device, or a discrete hardware component. The processor 1510 may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by a hardware decoding processor, or may be executed and accomplished by a combination of hardware and software modules in the decoding processor. A software module may be located in a mature storage medium in the art, such as a RAM, a flash memory, a ROM, a programmable ROM, an electrically erasable programmable memory, or a register. The storage medium is located in the memory 1540, and the processor 1510 reads information in the memory 1540 and completes the steps in the foregoing methods in combination with hardware of the processor.

In a possible implementation, the communications interface 1530 is configured to perform receiving and sending steps of any one of the data analytics network element, the access network element, the UPF network element, the AF network element, the SMF network element, and the AMF network element in the embodiments shown in FIG. 3A and FIG. 3B to FIG. 5A and FIG. 5B. The processor 1510 is configured to perform processing steps of any one of the data analytics network element, the access network element, the UPF network element, the AF network element, the SMF network element, or the AMF network element in the embodiments shown in FIG. 3A and FIG. 3B to FIG. 5A and FIG. 5B.

The communications unit may be an interface circuit or a communications interface of the apparatus, and is configured to receive a signal from another apparatus. For example, when the apparatus is implemented using a chip, the communications unit is an interface circuit or a communications interface used by the chip to receive a signal from or send a signal to another chip or apparatus.

In the foregoing embodiments, the instruction that is stored in the memory and that is to be executed by the processor may be implemented in the form of a computer program product. The computer program product may be written into the memory in advance, or may be downloaded and installed in the memory in the form of software.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium that can be stored in the computer, or a data storage device, such as a server or a data center, integrating one or more usable media. The usable medium may be a magnetic medium (for example, a floppy disk, a hard disk, or a magnetic tape), an optical medium (for example, digital versatile disc (DVD)), a semiconductor medium (for example, a solid-state drive (SSD)), or the like.

According to an aspect, a computer readable storage medium is provided. The computer readable storage medium stores an instruction, and when the instruction is run, a data analytics network element or a chip applied to the data analytics network element is enabled to perform step 101, step 102, step 103, step 104, step 106, step 108, step 110, step 114, step 116, step 105, step 107, and step 109 in the foregoing embodiments.

According to another aspect, a computer readable storage medium is provided. The computer readable storage medium stores an instruction, and when the instruction is run, a data analytics network element or a chip applied to the data analytics network element is enabled to perform step 201, step 202, step 203, step 204, step 206, step 208, step 205, step 207, and step 209 in the foregoing embodiments.

According to still another aspect, a computer readable storage medium is provided. The computer readable storage medium stores an instruction, and when the instruction is run, an access network element or a chip applied to the access network element is enabled to perform step 111, step 112, and step 113 in the foregoing embodiments.

According to yet another aspect, a computer readable storage medium is provided. The computer readable storage medium stores an instruction, and when the instruction is run, a second network element or a chip applied to the second network element is enabled to perform step 117, step 118, and step 119 in the foregoing embodiments.

The foregoing readable storage medium may include any medium that can store program code, such as a Universal Serial Bus (USB) flash drive, a removable hard disk, a ROM, a RAM, a magnetic disk, or an optical disc.

According to an aspect, a computer program product including an instruction is provided. The computer program product stores the instruction, and when the instruction is run, a data analytics network element or a chip applied to the data analytics network element is enabled to perform step 101, step 102, step 103, step 104, step 106, step 108, step 110, step 114, step 116, step 105, step 107, and step 109 in the foregoing embodiments.

According to another aspect, a computer program product including an instruction is provided. The computer program product stores the instruction, and when the instruction is run, a data analytics network element or a chip applied to the data analytics network element is enabled to perform step 201, step 202, step 203, step 204, step 206, step 208, step 205, step 207, and step 209 in the foregoing embodiments.

According to still another aspect, a computer program product including an instruction is provided. The computer program product stores the instruction, and when the instruction is run, an access network element or a chip applied to the access network element is enabled to perform step 111, step 112, and step 113 in the foregoing embodiments.

According to yet another aspect, a computer program product including an instruction is provided. The computer program product stores the instruction, and when the instruction is run, a second network element or a chip applied to the second network element is enabled to perform step 117, step 118, and step 119 in the foregoing embodiments.

According to an aspect, a chip is provided. The chip is applied to a data analytics network element, the chip includes at least one processor and a communications interface, and the communications interface is coupled to the at least one processor. The processor is configured to run an instruction, to perform step 101, step 102, step 103, step 104, step 106, step 108, step 110, step 114, step 116, step 105, step 107, and step 109 in the foregoing embodiments.

According to another aspect, a chip is provided. The chip is applied to a data analytics network element, the chip includes at least one processor and a communications interface, and the communications interface is coupled to the at least one processor. The processor is configured to run an instruction, to perform step 201, step 202, step 203, step 204, step 206, step 208, step 205, step 207, and step 209 in the foregoing embodiments.

According to an aspect, a chip is provided. The chip is applied to an access network element, the chip includes at least one processor and a communications interface, and the communications interface is coupled to the at least one processor. The processor is configured to run an instruction, to perform step 111, step 112, and step 113 in the foregoing embodiments.

According to another aspect, a chip is provided. The chip is applied to a second network element, the chip includes at least one processor and a communications interface, and the communications interface is coupled to the at least one processor. The processor is configured to run an instruction, to perform step 117, step 118, and step 119 in the foregoing embodiments.

All or some of the foregoing embodiments may be implemented using software, hardware, firmware, or any combination thereof. When a software program is used to implement the embodiments, the embodiments may be implemented completely or partially in the form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a DSL) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clearly that various modifications and combinations may be made to them without departing from the spirit and scope of this application. Correspondingly, the specification and accompanying drawings are merely example description of this application defined by the appended claims, and is considered as any of or all modifications, variations, combinations, or equivalents that cover the scope of this application. It is clearly that a person skilled in the art can make various modifications and variations to this application without departing from scope of this application. This application is intended to cover these modifications and variations of this application provided that they fall within the scope of protection defined by the following claims and their equivalent technologies.

What is claimed is:

1. A method, comprising:
receiving, by a data analytics device through a network management device, first data of a terminal from an access device, wherein the first data comprises first association information comprising a first identifier allocated by the access device to the terminal;
sending, by an access and mobility management function device, second data of the terminal to the data analytics device, wherein the second data comprises the first association information; and
associating, by the data analytics device, the first data with the second data based on the first association information.

2. The method of claim 1, wherein the first association information further comprises a second identifier of the access device.

3. The method of claim 2, wherein the second identifier comprises a global radio access network (RAN) node identifier (ID).

4. The method of claim 1, wherein the second data further comprises second association information, and wherein the method further comprises:
receiving, by the data analytics device, third data of the terminal from a session management function device, wherein the third data comprises the second association information; and
associating, by the data analytics device, the second data with the third data based on the second association information.

5. The method of claim 4, wherein the second association information comprises a third identifier of the terminal, wherein the third identifier comprises a subscription permanent identifier (SUPI) of the terminal.

6. The method of claim 4, wherein the third data further comprises third association information, and wherein the method further comprises:
receiving, by the data analytics device, fourth data of the terminal from a user plane function device, wherein the fourth data comprises the third association information; and
associating, by the data analytics device, the third data with the fourth data based on the third association information.

7. The method of claim 6, wherein the third association information comprises an internet protocol (IP) address of the terminal.

8. The method of claim 6, wherein the fourth data further comprises fourth association information, wherein the method further comprises:
receiving, by the data analytics device, fifth data of the terminal from an application function device, wherein the fifth data comprises the fourth association information; and
associating, by the data analytics device, the fourth data with the fifth data based on the fourth association information.

9. The method of claim 8, wherein the fourth association information comprises an IP 5-tuple.

10. The method of claim 8, wherein the first association information further comprises a first timestamp, wherein the second association information further comprises a second timestamp, wherein the third association information further comprises a third timestamp, and wherein the fourth association information comprises a fourth timestamp.

11. The method of claim 1, wherein the first identifier is allocated by the access device to the terminal on an interface, and wherein the interface is between the access device and the access and mobility management function device.

12. The method of claim 11, wherein the first identifier is a radio access network (RAN) user equipment (UE) next generation application protocol (NGAP) identifier (ID).

13. A system, comprising:
a data analytics device configured to receive first data of a terminal from an access device, wherein the first data comprises first association information comprising a first identifier allocated by the access device to the terminal; and
an access and mobility management function device in communication with the data analytics device and configured to send second data of the terminal to the data analytics device, wherein the second data comprises the first association information,
wherein the data analytics device is further configured to associate the first data with the second data based on the first association information.

14. The system of claim 13, wherein the first association information further comprises a second identifier of the access device.

15. The system of claim 13, wherein the second data further comprises second association information, and wherein the data analytics device is further configured to:
receive, third data of the terminal from a session management function device, wherein the third data comprises the second association information; and
associate the second data with the third data based on the second association information.

16. The system of claim 15, wherein the third data further comprises third association information, and wherein the data analytics device is further configured to:
receive fourth data of the terminal from a user plane function device, wherein the fourth data is stored on the user plane function device and comprises the third association information; and
associate the third data with the fourth data based on the third association information.

17. The system of claim 16, wherein the fourth data further comprises fourth association information, and wherein the data analytics device is further configured to:
receive fifth data of the terminal from an application function device, wherein the fifth data comprises the fourth association information; and
associate the fourth data with the fifth data based on the fourth association information.

18. The system of claim 17, wherein the first identifier is a radio access network (RAN) user equipment (UE) next generation application protocol identifier (RAN UE NGAP ID).

19. The system of claim 18, wherein the first association information further comprises a first timestamp, wherein the second association information further comprises a second timestamp, wherein the third association information further comprises a third timestamp, and wherein the fourth association information comprises a fourth timestamp.

20. The system of claim 13, wherein the first identifier is allocated by the access device to the terminal on an interface, and wherein the interface is between the access device and the access and mobility management function device.

* * * * *